US012550010B2

(12) United States Patent
Aherrao et al.

(10) Patent No.: US 12,550,010 B2
(45) Date of Patent: Feb. 10, 2026

(54) SYSTEMS AND METHODS FOR USN MONITORING VIA VIRTUAL TAP

(71) Applicant: NetScout Systems, Inc., Westford, MA (US)

(72) Inventors: Pritish Aherrao, Acton, MA (US); Brandon Bass, Flower Mound, TX (US); Loreto Di Resta, Modena (IT); Massimiliano Frigieri, Modena (IT); Tauras Liubinskas, Lexington, KY (US); Subappriya Muthuchamy, Fremont, CA (US); Yassine Nouir, Modena (IT); Alessandro Pinelli, Modena (IT); Sandeep Prasad, Pleasanton, CA (US); Abhishek Saraswati, Pleasanton, CA (US)

(73) Assignee: NetScout Systems, Inc., Westford, MA (US)

( * ) Notice: Subject to any disclaimer, the term of this patent is extended or adjusted under 35 U.S.C. 154(b) by 324 days.

(21) Appl. No.: 18/493,674

(22) Filed: Oct. 24, 2023

(65) Prior Publication Data

US 2025/0133448 A1 Apr. 24, 2025

(51) Int. Cl.
*H04W 36/00* (2009.01)
*H04W 8/02* (2009.01)
*H04W 12/0433* (2021.01)

(52) U.S. Cl.
CPC ......... *H04W 36/0038* (2013.01); *H04W 8/02* (2013.01); *H04W 12/0433* (2021.01)

(58) Field of Classification Search
CPC ............... H04W 36/0038; H04W 8/02; H04W 12/0433; H04W 12/04; H04W 36/12; H04W 36/1443
See application file for complete search history.

(56) References Cited

U.S. PATENT DOCUMENTS 10,299,184 B1 * 5/2019 Malhotra .......... H04W 36/0055
2012/0159151 A1 6/2012 Janakiraman et al.
(Continued)

FOREIGN PATENT DOCUMENTS

EP          3 393 101 B1    7/2020
WO    WO-2023/278433        1/2023

OTHER PUBLICATIONS

Raza, Muhammad Taqi, Songwu Lu, and Mario Gerla. "vepc-sec: Securing lte network functions virtualization on public cloud." IEEE Transactions on Information Forensics and Security 14.12 (2019): 3287-3297. (Year: 2019).*

(Continued)

*Primary Examiner* — Sharad Rampuria
(74) *Attorney, Agent, or Firm* — Foley & Lardner LLP

(57) ABSTRACT

Systems and methods for USN monitoring via virtual tap is provided. A system may obtain, from a virtual tap, virtual network data packets associated with a first type of wireless communication protocol. The system may extract a first ID from the virtual network data packets. The system may query a first database associated with the first type of wireless communication protocol or a second database using a second type of wireless communication protocol using the first ID. The system may determine a second ID and a security context based on the query. The system may convert the security context from a first type to a second type of security context. The system may store the converted security context into a field based on the second ID.

19 Claims, 16 Drawing Sheets

(56) References Cited

U.S. PATENT DOCUMENTS

2017/0311244 A1* 10/2017 Kodaypak ............... H04W 8/14
2022/0394485 A1* 12/2022 Ben Henda ....... H04W 36/0038

OTHER PUBLICATIONS

EP Extended Search Report dated Feb. 4, 2025 in European Patent Application No. 24195692.9.

* cited by examiner

SYSTEMS AND METHODS FOR USN MONITORING VIA VIRTUAL TAP

BACKGROUND

Digital services can be provided by servers to client devices over a network, such as the Internet. For example, servers can provide access to web sites, applications, content, or other digital services via cell towers within a geographical range of the client devices. As the client devices move locations and/or transition from one wireless communication technology to another, a handover from one cell site to another cell site may occur. To successfully perform the handover procedure, the cell sites, the network, the servers, and/or another device can track the client devices.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
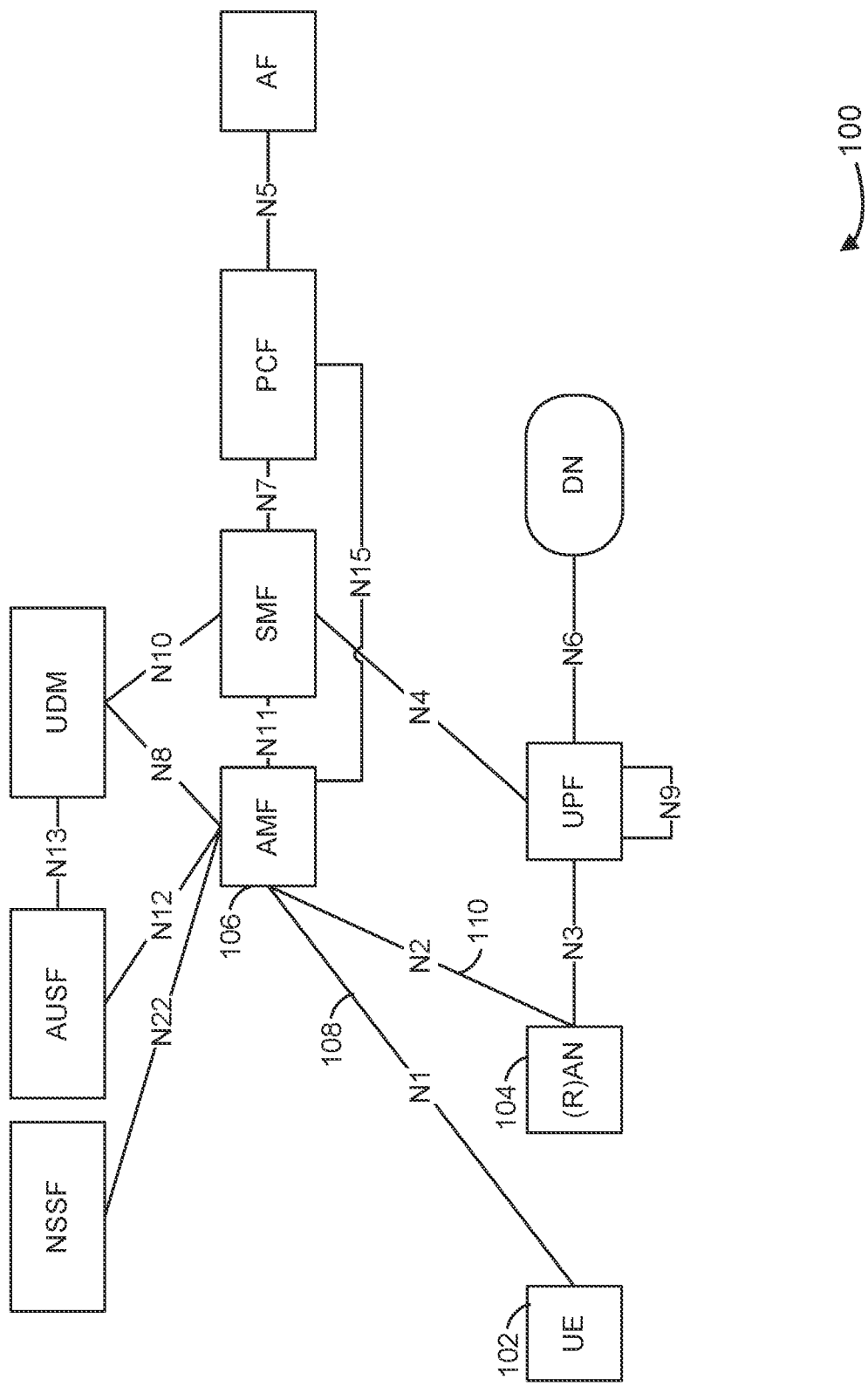
FIG. 1 is an illustration of a fifth generation (5G) communication network, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Some network communication systems may support multiple communication protocols. For instance, a system may support a second generation (2G), a third generation (3G), a 4G, and a 5G communication protocols, among other types of communication protocols. A client device serviced by the system may move from a cell site associated with a first communication protocol to a cell site associated with a second communication protocol different from the first. For example, the client device (e.g., a user equipment (UE)) may move physical locations. As the client device moves out of range of a 5G cell site and into the range of a 4G cell site, network nodes of the respective communication technologies (e.g., access and mobility function (AMF), mobility management entity (MME)) may communicate handover data (e.g., mapping, key, and security information) to provide continuous service to the client device. The network nodes may communicate the handover data via an external interface between the network nodes (e.g., N26).

A monitoring device may monitor (e.g., track) the client device. As the client device switches from one communication protocol to another (e.g., handover from 4G to 5G, handover from 5G to 4G), the monitoring device may capture the handover data being communicated by the network nodes via the external interface to continue tracking the client device. However, some systems may consolidate (e.g., combine) the network nodes into a single network node (e.g., AMF and MME combined into USN). By doing so, the external interface between the network nodes (e.g., N26) may be internal to the system and inaccessible to the monitoring device. Additionally, the systems may support a virtual environment (e.g., cloud computing). Due to the virtual environment, the monitoring device may not have direct access to the network and the handover data. Some systems may not support techniques for the monitoring device to continue tracking the client device during such a handover procedure.

A computer implementing the systems and methods described herein may provide enhancements (e.g., additions, updates, changes) to client device tracking and monitoring during handover procedures. For example, a computer, such as a monitoring device, may interface with a virtual tap. The monitoring device may obtain one or more virtual network data packets from the virtual tap. The virtual network data packets may include data from both of a first type of communication protocol and a second type of communication protocol. The virtual network data packets may be for a virtual network component and/or from the virtual network component. The virtual network component may combine a first virtual network node associated with a first type of communication protocol and a second virtual network node associated with a second type of communication protocol different from the first. The monitoring device may extract a first identification (ID) associated with the client device (e.g., a wireless communication device) performing either an idle or an active handover procedure from the first type of communication protocol to the second type of communication protocol. The monitoring device may query one or more databases using the first ID. The databases may include multiple second IDs and security contexts associated with a respective client device. Each database may be associated with one of the first type of communication protocol or the second type of communication protocol. Responsive to determining a second ID associated with the client device and a security context, the monitoring device may convert the security context from a first type of security context to a second type of security context. For instance, the monitoring device may convert one or more keys of the security context from a first type of key to a second type of key based on one or more parameters of the security context. The monitoring device may store the converted security context into a field of the databases using the second ID.

The techniques described herein may result in various advantages over the aforementioned technical deficiencies. For example, adopting the virtual network node monitoring procedure described herein may allow for monitoring a client device via a virtual environment during handover procedures from one communication protocol to another communication protocol. Additionally, the systems and methods described herein may allow for monitoring of the client device regardless of whether a network interface between a network node of the first communication protocol and a network node of the second communication protocol is available (e.g., is externally available to the monitoring device, is accessible to the monitoring device, etc.), among other advantages.

FIG. 1 is an illustration of a 5G communication network 100, in accordance with an implementation. The system 100 may include multiple network nodes and network interfaces between the network nodes and a client device to facilitate communication between the network nodes and between the client device and the network nodes. The system 100 may include a radio access network (RAN) 104 (e.g., a base station, a network node, a cell tower, etc.), a UE 102 (e.g., a client device, a wireless communication device, etc.), and an AMF 106 (e.g., a network node, a network entity, etc.). The system 100 may include a first network interface N1 108 and a second network interface N2 110 (e.g., access interfaces). The N1 108 may be an interface between the UE 102 and the AMF 106. The N2 110 may be an interface between the RAN 104 and the AMF 106. The UE 102 may communicate with the AMF 106 via the N1 108 and the RAN 104 may communicate with the AMF 106 via the N2 110. In some cases, the UE 102 may be an example of a phone, a smart phone, a laptop, a desktop, a tablet, a personal digital assistant, a portable computer, a smart television, a speaker, a wearable device, or other smart or wireless device.

Figure 2:
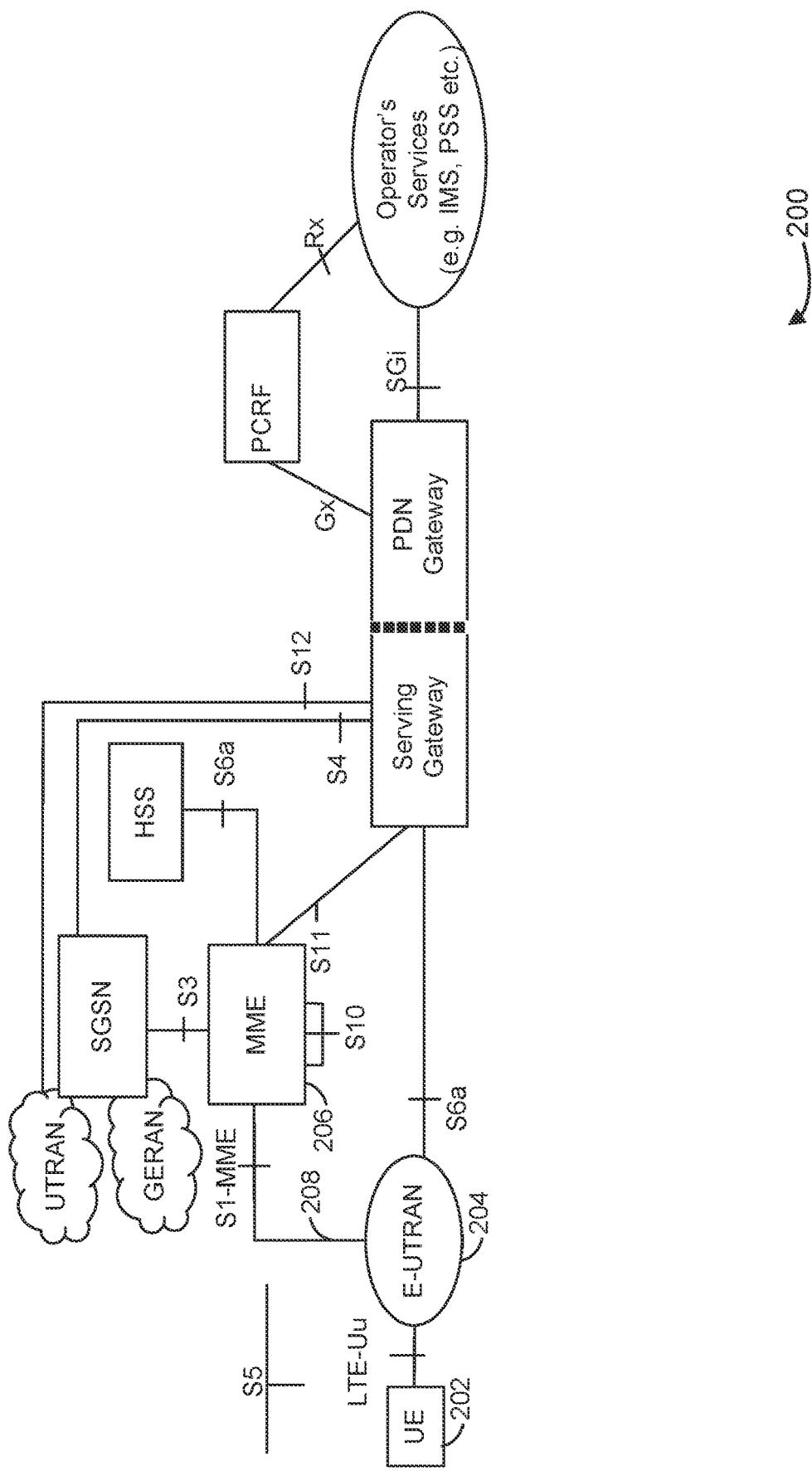
FIG. 2 is an illustration of a fourth generation (4G) communication network, in accordance with an implementation.

FIG. 2 is an illustration of a 4G communication network 200, in accordance with an implementation. The system 200 may include multiple network nodes and network interfaces between the network nodes and a client device to facilitate communication between the network nodes and between the client device and the network nodes. The system 200 may include a UE 202, an evolved universal mobile telecommunications service (UMTS) terrestrial radio access network (E-UTRAN) 204 (e.g., a base station, a network node, a cell tower, etc.), and an MME 206 (e.g., a network node, a network entity, etc.). The system 700 may include a first network interface S1 208 (e.g., S1-MME, an access interface). The S1 208 may be an interface between the E-UTRAN 204 and the MME 206. The UE 202 may communicate with the MME 206 via the E-UTRAN 204 and the S1 208. The UE 202 may be an example of the UE 102.

In some cases, the MME 206 may communicate with an AMF (e.g., AMF 706 as described herein with reference to FIG. 1) via a network interface N26 during 4G to 5G and 5G to 4G handover procedures. The MME 206 and the AMF 706 may communicate information via the N26. The information may include mapping and key information and other security parameters to support the handover procedure, as described with reference to Table 1.

TABLE 1

N26 Interface Information

| Interface | Key | Description | Correlation and System Impact |
| --- | --- | --- | --- |
| N26 | International mobile subscriber identity (IMSI) and global unique temporary identifier (GUTI). | Contains the Permanent User ID (IMSI) and Temporary User ID from 4G/5G. | The temporary user ID may be mapped in the GUTI and may be used in a registration message or tracking area message to help map the UE 202 to the permanent ID when the UE 202 is moving between the AMF 706 and the MME 206. |
| N26 | Deciphering Keys and other Security Parameters. | Deciphering Keys and other Security parameters used by the 4G node (MME) or 5G node (AMF). | The incoming keys and security parameters can be used by a monitoring device to decipher non-access stratum (NAS) messages in the new AMF 706 or new MME 206 (based on a 4G to 5G handover or a 5G to 4G handover). |

Figure 3:
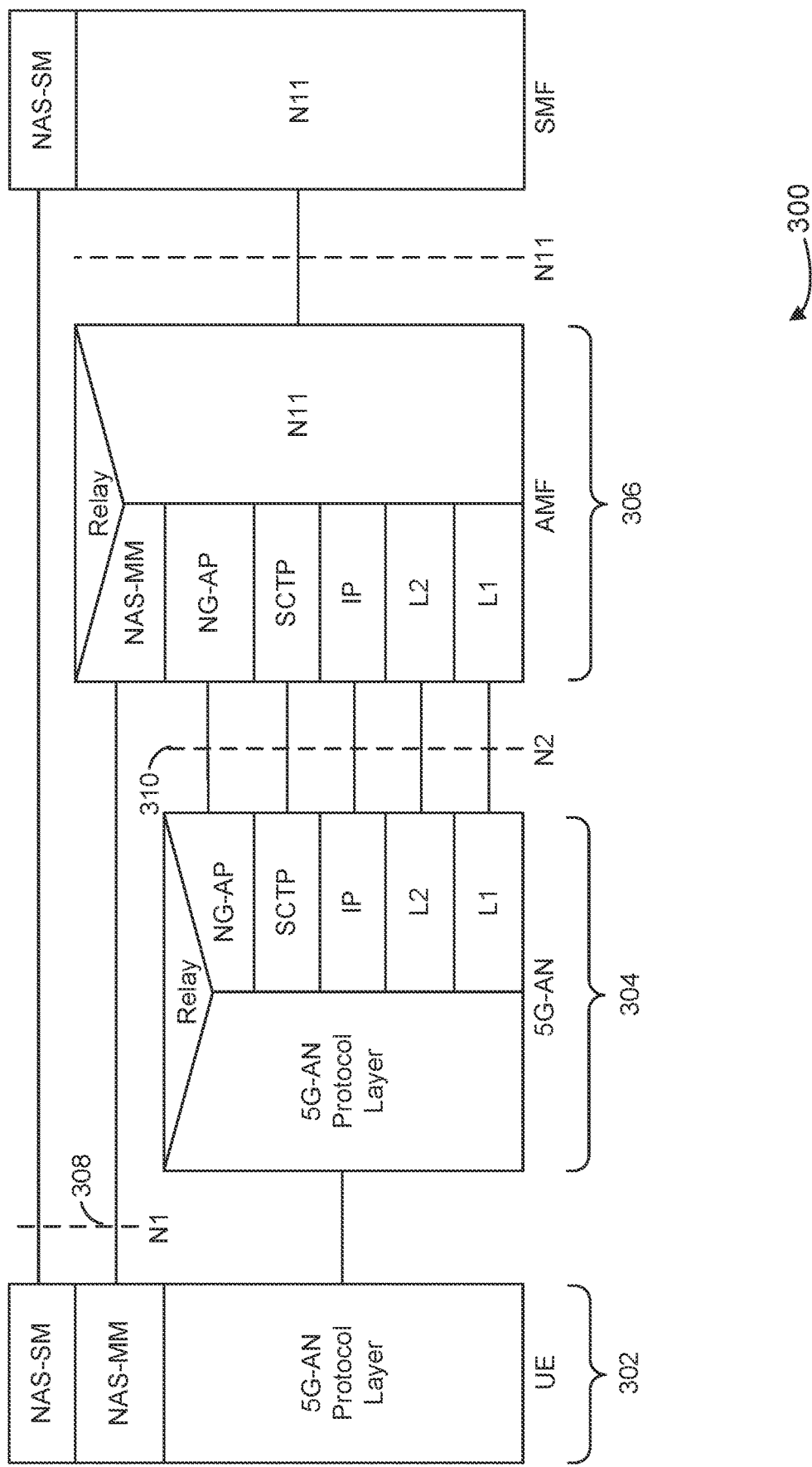
FIG. 3 is an illustration of a 5G network protocol stack, in accordance with an implementation.

FIG. 3 is an illustration of a 5G network protocol stack 300, in accordance with an implementation. The system 300 may include similar (e.g., same) components as described herein with reference to FIG. 1. The system 300 may include a UE 302, a RAN 304, and an AMF 306. The system 300 may include a network interface N1 308 between the UE 302 and the AMF 306. The system 300 may include a network interface N2 310 between the RAN 304 and the AMF 306. The UE 302, the RAN 304, and the AMF 306 may communicate one or more messages (e.g., network data packets, data, signals, etc.) as part of a subscriber session (e.g., a communication session) via the N1 308 and the N2 310. For example, the UE 302 may communicate NAS messages (e.g., NAS-mobility management (NAS-MM), NAS-session management (NAS-SM), etc.) with the AMF 306 via the N1 308. The RAN 304 may communicate multiple types of messages including control plane signaling (e.g., next-generation application protocol (NG-AP)) with the AMF 306 via the N2 310. In some implementations, the messages via the N1 308 and the N2 310 may be ciphered (e.g., encoded).

Figure 4:
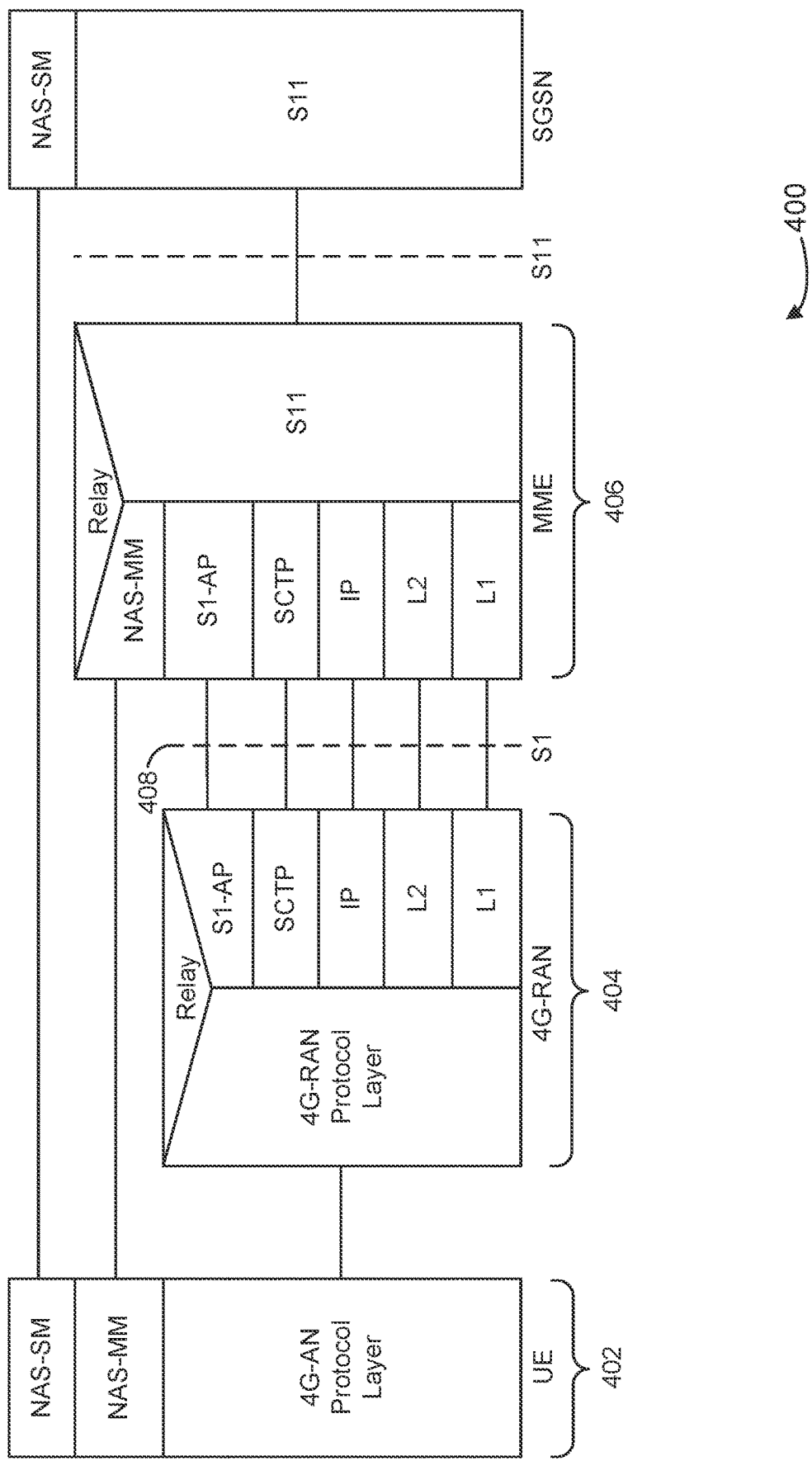
FIG. 4 is an illustration of a 4G network protocol stack, in accordance with an implementation.

FIG. 4 is an illustration of a 4G network protocol stack 400, in accordance with an implementation. The system 400 may include similar (e.g., same) components as described herein with reference to FIG. 2. The system 400 may include a UE 402, an E-UTRAN 404, and an MME 406. The system 400 may include a network interface S1 408 between the E-UTRAN 404 and the MME 406. The UE 402, the RAN 404, and the AMF 406 may communicate one or more messages (e.g., network data packets, data, signals, etc.) as part of a subscriber session (e.g., a communication session) via the S1 408. The messages may be ciphered NAS messages (e.g., NAS-MM, NAS-SM, etc.).

Figure 5:
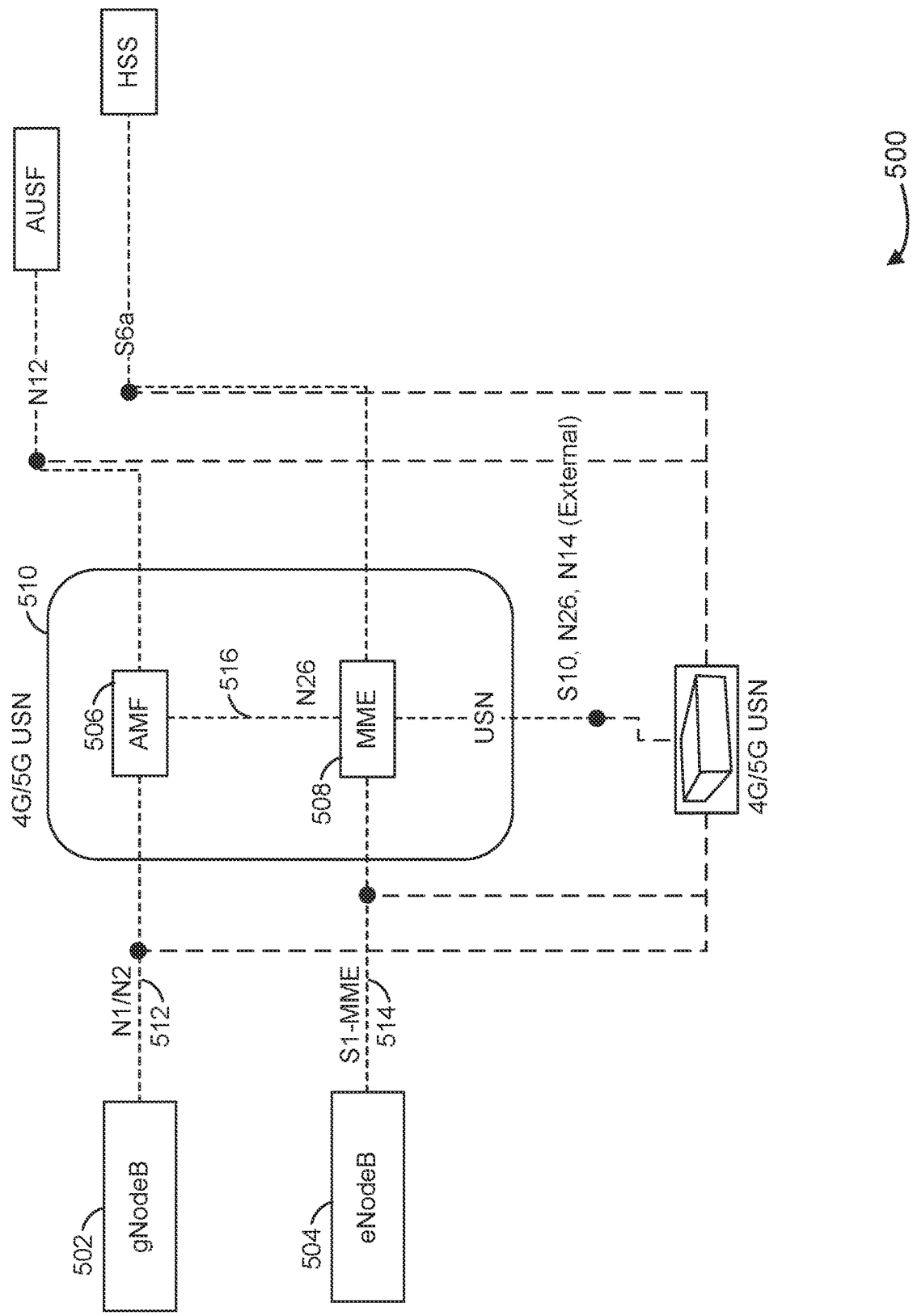
FIG. 5 is an illustration of a network system, in accordance with an implementation.

FIG. 5 is an illustration of a network system 500, in accordance with an implementation. The system 500 may include similar (e.g., same) components as described herein with reference to FIGS. 1-4. The network system 500 may include a first base station 502 (e.g., gNodeB, a RAN), a second base station 504 (e.g., eNodeB, an E-UTRAN), and a USN 510. The first base station may be associated with a first wireless communication protocol (e.g., 5G) and the second base station may be associated with a second wireless communication protocol (e.g., 4G). The USN 510 may include an AMF 506 and an MME 508. For instance, the USN 510 may consolidate components associated with different wireless communication protocols into a single network node (e.g., 2G/3G/4G/5G USN). Because the USN 510 includes both the AMF 506 and the MME 508, the USN 510 may communicate one or more messages (e.g., NAS messages, network data packets, messages for handover, etc.) with the first base station 502 and the second base station 504 via an external interface N1/N2 512 and an external interface S1 514. The USN 510 may include an internal network interface N26 516. The N26 516 may be an access interface between the AMF 506 and the MME 508. Because the interfaces N1/N2 512 and S1 514 are external interfaces and the interface N26 516 is an internal interface, a monitoring device may have access to (e.g., collect data being transmitted via) the interfaces N1/N2 512 and S1 514 but not the interface N26 516.

Figure 6:
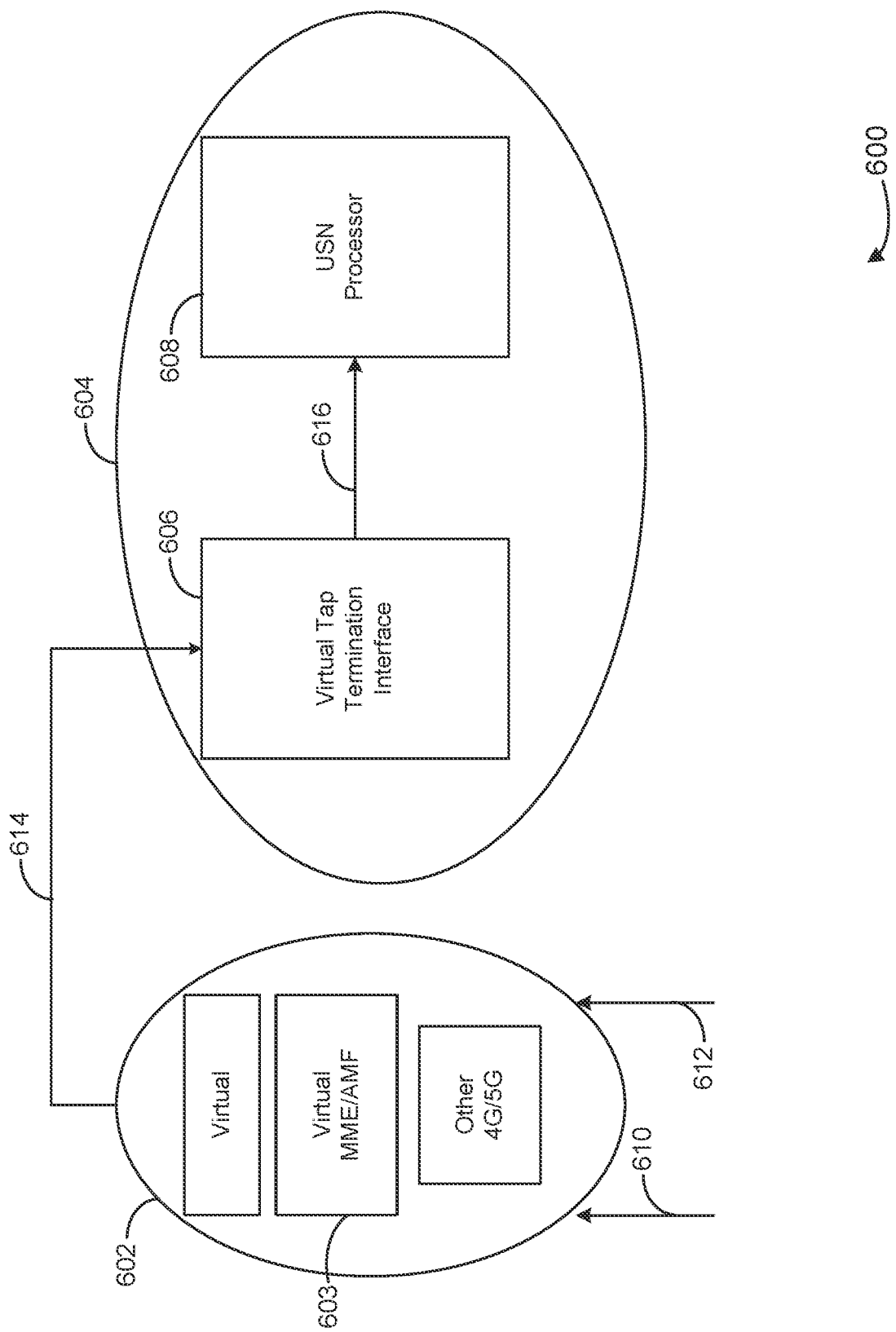
FIG. 6 is an illustration of a system for unified serving node (USN) monitoring via a virtual tap, in accordance with an implementation.

FIG. 6 is an illustration of a system 600 for USN monitoring via a virtual tap, in accordance with an implementation. The system 600 may include a virtual environment 602 and a monitoring device 604. The virtual environment 602 may be an example of the network 705, the cloud providers 708, or another network entity. The monitoring device 604 may be an example of the data processing system 710. The virtual environment 602 may include virtual components associated with network nodes. For example, the virtual environment 602 may include a virtual USN 603. The virtual USN 603 may be associated with a USN node of a network. The USN node may include a combination of an MME node and an AMF node, as well as a network interface (e.g., N26) between the MME node and the AMF node. The monitoring device 604 may include a virtual tap termination interface 606 and a USN processor 608.

The virtual environment 602 may collect (e.g., obtain, receive, etc.) data packets. The virtual environment 602 may collect data packets 612 from a first network interface (e.g., S1, external S10, s6a, N26, etc.). The virtual environment 602 may collect data packets 610 from a second network interface (e.g., N1, N2, both N1/N2, external N12, N14, N26). The first network interface may be associated with a first type of wireless communication protocol (e.g., 4G) and the second network interface may be associated with a second type of wireless communication protocol (e.g., 5G). The virtual environment 602 may process the data packets 612 and 610. For example, the virtual environment 602 may format the data packets 612 and 610 based on a virtual protocol. The formatting may include modifying the data packets 612 and 610 with meta data associated with the virtual protocol.

The virtual environment 602 may send (e.g., transmit, transfer, etc.) the modified data packets 612 and 610 to the virtual interface 606 via a virtual tap 614. For instance, the monitoring device 604 may be in communication with the virtual environment 602 via the virtual tap 614. The virtual tap 614 may be a wireless communication channel, a link, or any communication protocol or application programming interface (API) for obtaining (e.g., fetching, retrieving, querying, requesting, communicating, transmitting, etc.) the modified data packets 612 and 610 (e.g., virtual data packets). In some cases, the modified data packets may be packets for and/or from the virtual USN 603 (e.g., for or from the virtual MME/AMF).

The virtual interface 606 may receive the modified data packets 612 and 610. The virtual interface 606 may process the modified data packets 612 and 610. To do so, the virtual interface 606 may convert the modified data packets 612 and 610 back to a standardized format (e.g., back to an original format, a network communication protocol format, unmodified data packets 612 and 610). The virtual interface 606 may filter the data packets 612 and 610. For example, the virtual interface 606 may filter the data packets 612 and 610 for data packets and/or data associated with a handover procedure (e.g., S1 AP/NAS, S10, N26, s6a, N1/N2 NAS, N12, N14, and N26 packets). The virtual interface 606 may send the filtered data packets 616 to the USN processor 608. The USN processor 608 may process the filtered data packets 616, as described herein with reference to FIG. 7.

Figure 7:
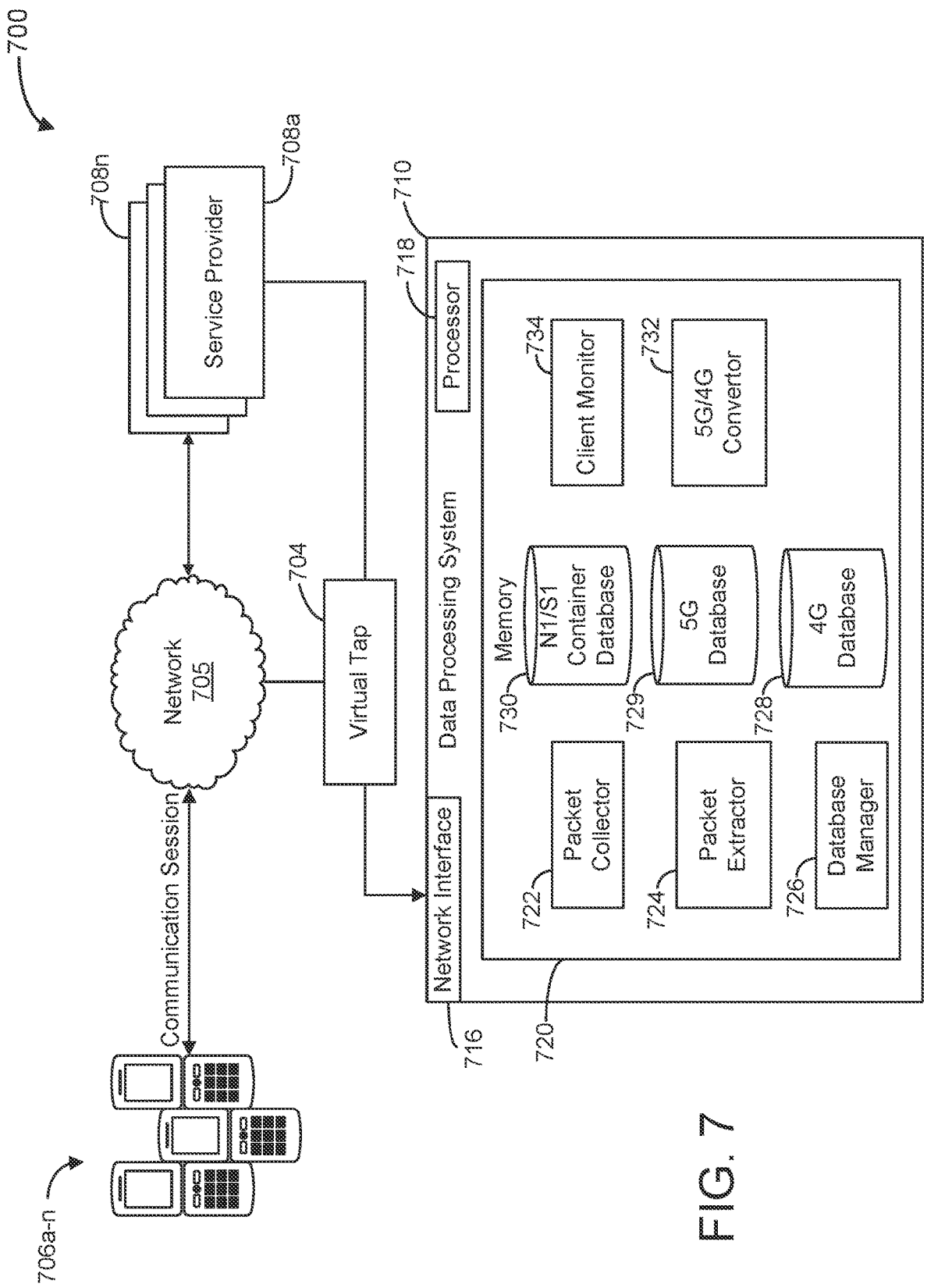
FIG. 7 is an illustration of a system for USN monitoring via a virtual tap, in accordance with an implementation.

FIG. 7 is an illustration of a system 700 for USN monitoring via a virtual tap, in accordance with an implementation. In brief overview, the system 700 can include, access, or otherwise interface with one or more of a client device 706, a service provider or cloud providers 708a-n (e.g., an internet service provider (ISP), cloud providers 708 or service providers 708), a virtual tap 704, and data processing system 710. The client device 706 can include one or more processors. The client device 706 may be an example of a UE or other device that can access a network 705. The client device 706 can communicate with the service providers 708 via the network 705 to access a service (e.g., a website, an application, etc.) via a cloud provider 708. The data processing system 710 can communicate with the service providers 708 and the client device 706 via a virtual tap 704. In some implementations, the data processing system 710 can communicate with the service providers 708 and the client device 706 via the network 705.

The data processing system 710, the client device 706, or the service provider 708 can include or execute on one or more processors or computing devices (e.g., computing device 1402 depicted in FIG. 14C) and communicate via the network 705 and/or the virtual tap 704. The network 705 can include computer networks such as the Internet, local, wide, metro, or other area networks, intranets, satellite networks, and other communication networks such as voice or data mobile telephone networks. Via the network 705, the client device 706 can access information or data provided by the service. For example, the network 705 can be used to access information resources such as web pages, web sites, domain names, or uniform resource locators that can be presented, output, rendered, or displayed on at least one computing device, such as a laptop, desktop, tablet, personal digital assistant, smart phone, portable computers, or speaker.

Each of the client device 706, the data processing system 710, or the service provider 708 can include or utilize at least one processing unit or other logic device such as programmable logic array engine, or module configured to communicate with one another or other resources or databases. The components of the client device 706, the service providers 708, and/or the data processing system 710 can be separate components or a single component. The system 700 and its components can include hardware elements, such as one or more processors, logic devices, or circuits.

The network 705 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 705 may include a wireless link, such as an infrared channel or satellite band. The topology of the network 705 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 705 may be or include a self-organizing network that implements a machine learning model to automatically adjust connections and configurations of network elements of network 705 to optimize network connections (e.g., minimize latency, reduce dropped calls, increase data rate, increase quality of service, etc.).

The cloud provider 708 can be hosted by a third-party cloud service provider via a virtual environment. The cloud provider 708 can be hosted in a public cloud, a co-location facility, or a private cloud. The cloud provider 708 can be hosted in a private data center, or on one or more physical servers, virtual machines, or containers of an entity or customer. The cloud provider 708 may each be or include servers or computers configured to transmit or provide services across the network 705 to the client devices 706. The cloud provider 708 may transmit or provide such services upon receiving requests for the services from any of the client devices 706. The term "service" as used herein includes the supplying or providing of information over a network and is also referred to as a communications network service. Examples of services may include 5G broadband services, any voice, data or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The cloud provider 708 can be hosted or refer to cloud 1410 depicted in FIG. 14B. The cloud provider 708 may include or be the virtual environment 602 depicted in FIG. 6.

The client device 706 can establish communication sessions with the service providers 708 to receive data from the cloud providers 708. For example, a user associated with the client device 706 may request a service. Responsive to the request, a cloud provider 708 associated with the service may send requested data to the client device 706 in a communication session. The client devices 706 may establish communication sessions with the cloud providers 708 for any type of application or for any type of call.

The client device 706 can be located or deployed at any geographic location in the network environment depicted in FIG. 7. The client device 706 can be deployed, for example, at a geographic location where a typical user using the client device 706 would seek to connect to a network (e.g., access a browser or another application that requires communication across a network). For example, a user can use a client device 706 to access the Internet at home, as a passenger in a car, while riding a bus, in the park, at work, while eating at a restaurant, or in any other environment. The client device 706 can be deployed at a separate site, such as an availability zone managed by a public cloud provider (e.g., a cloud 1410 depicted in FIG. 14B). If the client device 706 is deployed in a cloud 1410, the client device 706 can include or be referred to as a virtual client device or virtual machine. In some cases, the client devices 706 and/or the data processing system 710 can be deployed in the cloud 1410 on the same computing host in an infrastructure 1416, described herein with respect to FIG. 14B.

The data processing system 710 may include one or more processors 718 that may be configured to obtain virtual network data packets associated with the network 705, the service providers 708, and/or the client devices 706 via the virtual tap 704, process the virtual network data packets, and track the client devices 706 during a handover procedure based on the processing. The data processing system 710 can include a network interface 716, the one or more processors 718, and memory 720. The data processing system 710 may communicate with any of the client device 706, the network 705, the service providers 708 and/or the virtual tap 704 via the network interface 716. The processor 718 may be or include an ASIC, one or more FPGAS, a DSP, circuits containing one or more processing components, circuitry for supporting a microprocessor, a group of processing components, or other suitable electronic processing components. In some embodiments, the processor 718 may execute computer code or modules (e.g., executable code, object code, source code, script code, machine code, etc.) stored in the memory 720 to facilitate the operations described herein. The memory 720 may be any volatile or non-volatile computer-readable storage medium capable of storing data or computer code.

The memory 720 may include one or more of a packet collector 722, a packet extractor 724, a database manager 726, a first database 728 associated with a first type of wireless communication protocol (e.g., 4G, 5G, etc.), a second database 729 associated with a second type of wireless communication protocol (e.g., 5G, 4G, etc.) different from the first type of wireless communication protocol, a third database 730 associated with both the first and second type of wireless communication protocol, a wireless communication protocol convertor 732, and an client monitor 734. The data processing system 710 may further include other components, managers, handlers, etc. to perform the techniques as described herein. In brief overview, the components 722-734 may obtain, from a virtual tap, virtual network data packets. The components 722-734 may extract, from the virtual network data packets, a first ID associated with the client device 706 performing a handover procedure (e.g., an idle handover, an active handover) from the first type of wireless communication protocol to the second type of wireless communication protocol. The components 722-734 may query one or more databases associated with the first or second type of wireless communication protocol. The components 722-734 may determine a second ID and a security context based on the query. The components 722-734 may convert the security context from a first type of security context to a second type of security context. The components 722-734 may store the converted security context into a field of the one or more databases based on the second ID. The components 722-734 may monitor the client device 706 based on the converting.

In some cases, a client device 706 may switch from a first wireless communication protocol to a second wireless communication protocol. For example, the client device 706 may switch from a 4G protocol to a 5G protocol, or vice versa. The client device 706 may switch based on moving from a 4G cell site to a 5G cell site, based on a modification to one or more network configurations, based on a loss of connection, based on a degradation of connection, among other examples. The data processing system 710 may be monitoring the client device 706 before the switch. To continue monitoring the client device 706, the data processing system 710 may capture (e.g., obtain, receive, etc.) one or more virtual network data packets from the virtual tap 704. For ease of description, hereinafter, the first wireless communication protocol is referred to as the 4G protocol and the second wireless communication protocol is referred to as the 5G protocol. However, it is understood that either the first or the second wireless communication protocol may represent any type of wireless communication protocol, such as, but not limited to, 2G, 3G, 4G, LTE, 5G, etc. The examples as described herein may be reversed for the other wireless communication protocol (e.g., a handover procedure from 4G to 5G may be similar to a handover procedure from 5G to 4G).

The packet collector 722 may comprise programmable instructions that, upon execution, cause the processor 718 to obtain the virtual packets. For example, the packet collector 722 may obtain, from virtual tap 704, a message including the virtual packets. The packet collector 722 may receive the message via an API or another communication protocol provided by the virtual tap 704. The packet collector 722 may convert the virtual packets to a standardized format (e.g., a format associated with non-virtual packets). The packet collector 722 may filter the standardized packets based on whether each packet is associated with a handover procedure, as described herein with reference to FIG. 6. The filtered packets may be associated with a virtual USN including a virtual AMF and a virtual MME. In some implementations, the virtual packets may be associated with the 4G, 5G, or both protocols.

The packet extractor 724 may comprise programmable instructions that, upon execution, cause the processor 718 to extract, from the packets, a first ID. The first ID may be associated with the client device 706 performing a first or second type of handover procedure from 4G to 5G, or vice versa. For example, the first type of handover procedure may be an idle handover procedure and a second type of handover procedure may be an active handover procedure. The active handover procedure may include the client device 706 actively processing (e.g., communicating) a communication session while switching from 4G to 5G. The idle handover procedure may include the client device 706 switching from 4G to 5G without an active communication session in progress.

In some implementations, for the idle handover, the first ID may be a global unique temporary identifier (GUTI). The packet extractor 724 may determine the GUTI based on a status and mobile identity of the client device 706. For instance, the packet extractor 724 may extract the status of the client device 706 from the packets. The status may be a UE status that includes a UE registration state for S1 and N1. The packet extractor 724 may extract the mobile identity of the client device 706 from the packets. The mobile identity may be a 5G system (5GS) mobile identity (e.g., for 4G to 5G handover) or an evolved packet system (EPS) mobile identity (e.g., for 5G to 4G handover). The packet extractor 724 may determine whether the UE status satisfies a threshold. For example, the packet extractor 724 may determine whether a first parameter (e.g., S1 registration) is true in a field of the UE status (e.g., for 4G to 5G handover) or whether a second parameter (e.g., N1 registration) is true in a field of the UE status (e.g., for 5G to 4G handover). The packet extractor 724 may convert the mobile identity from a first format (e.g., 5G GUTI format) to a second format (e.g., 4G GUTI format) for 4G to 5G idle handover or vice versa for 5G to 4G idle handover. In some cases, the first ID may be the converted GUTI. Additionally, or alternatively, the packet extractor 724 may extract an additional ID (e.g., an additional GUTI) from the packets.

In some implementations, for the active handover, the first ID may be a source to target transparent container (S2TTC). The packet extractor 724 may extract the S2TTC from the packets (e.g., an N2 handover required packet, an S1 handover required packet, an N2 handover request packet, an S1 handover request packet, etc.). Additionally, or alternatively, the packet extractor 724 may extract other data from the packets. For instance, the packet extractor 724 may extract an indication of a handover type from the packets (e.g., from N2 handover required packet, from S1 handover required packet). The packet extractor 724 may extract a next hop value from the packets (e.g., from initial context setup, UE context modify request, pathswitch request acknowledge, handover request, from an NG_USN_KEYDB field).

The database manager 726 may comprise programmable instructions that, upon execution, cause the processor 718 to communicate with (e.g., query, request, receive, fetch, etc.) one or more databases (e.g., the first database 728, the second database 729, the third database 730, etc.). The databases 728, 729, and 730 (e.g., relational, non-relational, object-oriented databases) may support tracking multiple client devices 706. Each database may be associated with a respective technology (e.g., communication protocol). The database 728 may be associated with 4G data (e.g., second IDs, user identities, security contexts, keys, etc.) and the database 729 may be associated with 5G data. For instance, the databases 728, 729, and 730 may include one or more of the data as described with reference to Table 2.

TABLE 2

4G/5G Databases

| Field | Database 728 | Database 729 | Summary |
|---|---|---|---|
| IMSI | Y | Y | Permanent user ID. The data processing system 710 may look up a table by IMSI when IMSI is known. |
| International Mobile Equipment Identity (IMEI) | Y | Y | Equipment ID. The data processing system 710 may transfer the IMEI between databases 728 and 729 during USN handovers. |
| 4G GUTI | Y | N | The data processing system 710 may convert the 4G GUTI to 5G GUTI and may look up in database |

TABLE 2-continued

4G/5G Databases

| Field | Database 728 | Database 729 | Summary |
|---|---|---|---|
| 5G GUTI | N | Y | 729. The data processing system 710 may convert the 5G GUTI to 4G GUTI and lookup in database 728. |
| Security Key | Y | N | Initial 32 byte value for next hop derivation. |
| Next Hop | Y | Y | The data processing system 710 may retrieve next hop from database 728 and may use the next hop for KASME to KAMF key conversion. |
| Uplink/Downlink (UL/DL) NAS Count | Y | Y | Part of 4G and 5G NAS security context. The data processing system 710 may transfer NAS counts during USN handovers. The data processing system may use DL NAS count for KAMF to KASME key conversion. |
| Security Algorithms (Encryption and Integrity) | Y | Y | Part of 4G and 5G NAS security context. The data processing system 710 may transfer security algorithms during USN handovers. |
| Key Set Identifier (KSI) | Y | Y | The data processing system 710 may use the KSI to find a key specified by network signaling. The data processing system 710 may transfer the KSI along with a deciphering key during USN handovers. |
| Key Access Security Management Entry (KASME) Deciphering Key | Y | N | 4G deciphering key. The data processing system 710 may transfer and convert the KASME to KAMF during USN handovers. |
| Key Access and Mobility Management Function (KAMF) Deciphering Key | N | Y | 5G deciphering key. The data processing system 710 may transfer and convert KAMF to KASME during USN handovers. |
| Authentication Token/Authentication Response (AUTN/RES) | Y | Y | |

Table 2 may indicate fields included in each database 728 and 729, where a "Y" indicates included (e.g., Yes) and an "N" indicates not included (e.g., No). The databases 728, 729, and 730 may include one or more respective tables. For instance, the database 728 may include a 4G user table and a 4G key table, the database 729 may include a 5G user table and a 5G key table, and the database 730 may include an S1 container table and an N1 container table.

The database manager 726 may query the first database 728, the second database 729, or the third database 730. The database manager 726 may query the databases 728 or 729 using the first ID. The database manager 726 may use the first ID as a key (e.g., an ID, an attribute, to identify a tuple) for determining (e.g., looking up, retrieving) a respective second ID and a respective security context associated with the client 706. In some examples, for 4G to 5G idle handover, the database manager 726 may query the database 728 (e.g., a 4G user table, an NG_USN_KEYDB table) using the first ID to retrieve the second ID and security context (e.g., current 4G security context including KAME, algos, KSI, NAS counts, etc.). In some examples, for 5G to 4G idle handover, the database manager 726 may query the database 729 (e.g., a 5G user table and a 5G key table) using the first ID to retrieve the second ID and security context (e.g., current 5G security context including KSEAF, KAMF, algos, KSI, NAS counts). In some examples, for 4G to 5G active handover, the database manager 726 may query the database 730 (e.g., the N1 container table) using the first ID to retrieve the second ID and query the database 728 using the second ID to retrieve the security context and next hop value. In some examples, for 5G to 4G active handover, the database manager 726 may query the database 730 (e.g., the S1 container table) using the first ID to retrieve the second ID and query the database 729 using the second ID to retrieve the security context. In some implementations, the second ID may be an IMSI. In some implementations, the database manager 726 may use the additional GUTI as the key to retrieve the second ID and the security context.

In some implementations, for the active handover, the database manager 726 may store (e.g., insert, add, update, put, etc.) the other data from the packets. For example, the database manager 726 may store, for active 4G to 5G handover, the next hop value into a field of the databases 728 or 730, or another database associated with next hop values (e.g., in an NG_USN_KEYDB table). The database manager 726 may store, for the active handover, the second ID associated with the client 706 based on the indication of the handover type. For example, if the handover type is LTE to 5GS (for 4G to 5G handover), the database manager 726 may store the second ID as a value into an entry of the database 730 (e.g., into the N1 container table) with the first ID as the key. If the handover type is 5GS to EPS (for 5G to 4G handover), the database manager 726 may store the second ID as a value into an entry of the database 730 (e.g., into the S1 container table) with the first ID as the key.

The wireless communication protocol convertor 732 may comprise programmable instructions that, upon execution, cause the processor 718 to convert the security context from a first type of security context to a second type of security context. For example, the convertor 732 may convert at least a portion of the security context (e.g., one or more parameters of the security context) from the first type to the second type. In some implementations, for 4G to 5G handover, the convertor 732 may convert a 4G KASME of the security context to a 5G KAMF. To do so, the convertor 732 may use an UL NAS count of the security context (e.g., for idle handover) or a second next hop value (e.g., for active handover). In some cases, the convertor 732 may derive (e.g., calculate, determine, generate) the second next hop value based on the next hop value (e.g., retrieved from the database 728). In some implementations, for 5g to 4G handover, the convertor 732 may convert a 5G KAMF of the security context to a 4G KASME. To do so, the convertor 732 may use an UL NAS (e.g., for idle handover) count or a DL NAS count (e.g., for active handover) of the security context. In some cases, the security context may include a KSEAF. The convertor 732 may convert the KSEAF to the 5G KAMF in order to convert the 5G KAMF to the 4G KASME.

The database manager 726 may store the converted security context based on the second ID. In some implementations, for 4G to 5G idle and active handover, the database manager 726 may store the converted security context into a field of the database 729 using the second ID as a respective key. In some implementations, for 5G to 4G idle and active handover, the database manager 726 may store the converted security context into a field of the database 728 using the second ID as a respective key.

The client monitor 734 may comprise programmable instructions that, upon execution, cause the processor 718 to monitor (e.g., track) the client device 706 based on the converted security context. Because the virtual interface between the virtual AMF and the virtual MME (e.g., the virtual USN) is an internal interface (e.g., inaccessible to a monitoring device), to monitor the client device 706 during and after a handover procedure (e.g., switching from a first wireless communication protocol to a second wireless communication protocol) the client monitor 734 may determine the converted security context.

Figure 8:
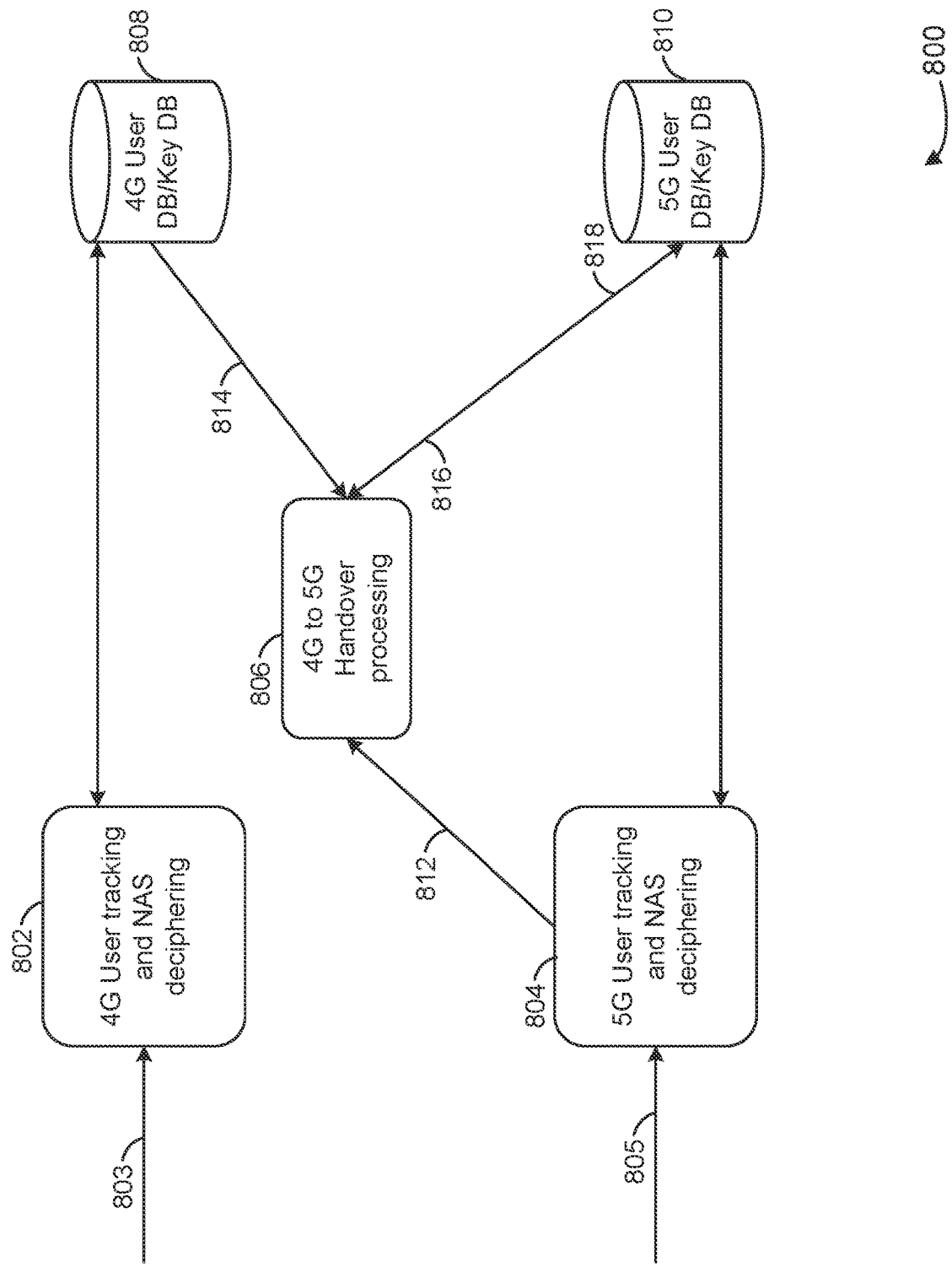
FIG. 8 is an illustration of a flow diagram of a system for USN monitoring via a virtual tap, in accordance with an implementation.

FIG. 8 is an illustration of a flow diagram of a system 800 for USN monitoring via a virtual tap, in accordance with an implementation. The system 800 can be similar to a data processing system (the data processing system 710, shown and described with reference to FIG. 7). The system 800 may include more or fewer components. The system 800 may support a 4G to 5G idle handover procedure.

The data processing system can include a 4G interface 802, a 5G interface 804, a handover processor 806, a 4G database 808, and a 5G database 810. The 4G database 808 and the 5G database 810 may include respective user and key databases. The 4G interface 802 may receive data 803 associated with a 4G communication process. For example, the data 803 may include a general packet radio service (GPRS) tunneling protocol (GTP) mobility including external N26, s6a data, S1AP/NAS data, etc. The 5G interface 804 may receive data 805 associated with a 5G communication process. For example, the data 805 may include a GTP mobility including external N26, hypertext transfer protocol (HTTP)2 N12/N14, NGAP/NAS, etc. The data 803/805 may be data converted from a virtual format to a network format, as described herein with reference to FIG. 6. The interfaces 802 and 804 may receive the data from a virtual tap or a virtual tap interface.

The interfaces 802 and 804 may communicate with the databases 808 and 810. The interface 802 may use the data 803 to communicate with the database 808. For example, the interface 802 may store the data 803 into the database 808. The interface 802 may use the data 803 to retrieve stored data from the database 808. The stored data may include IMSI, 4G GUTI, IMEI, 4G security context, etc. The interface 804 may use the data 805 to communicate with the database 810. For example, the interface 804 may store the data 805 into the database 810. The interface 804 may use the data 805 to retrieve stored data from the database 810. The stored data may include IMSI, 5G GUTI, IMEI, 5G security context, etc.

The interface 804 may extract data 812 from the data 805. The extracted data 812 may include an N1 registration, a UE status, a 5G GUTI (e.g., a mobile identity), an additional GUTI, or any combination thereof. The interface 804 may send the extracted data 812 to the handover processor 806. The handover processor 806 may determine whether the extracted data 812 includes the additional GUTI. If the extracted data 812 includes the additional GUTI, the handover processor 806 may query the database 810 using the additional GUTI to retrieve data 816 (e.g., an ID, an IMSI). If the extracted data 812 does not include the additional GUTI, the handover processor 806 may convert the 5G GUTI to a 4G GUTI and query the database 808 using the converted GUTI to retrieve data 814 (e.g., an ID, an IMSI, 4G security context). Responsive to determining the IMSI and the security context, the handover processor 806 may convert one or more parameters of the security context. For example, the handover processor may convert a first key (e.g., KASME) to a second key (e.g., KAMF). The handover processor 806 may send (e.g., insert, store, input, update) data 818 to the database 810, the data 818 including the IMSI and the converted security context.

Figure 9:
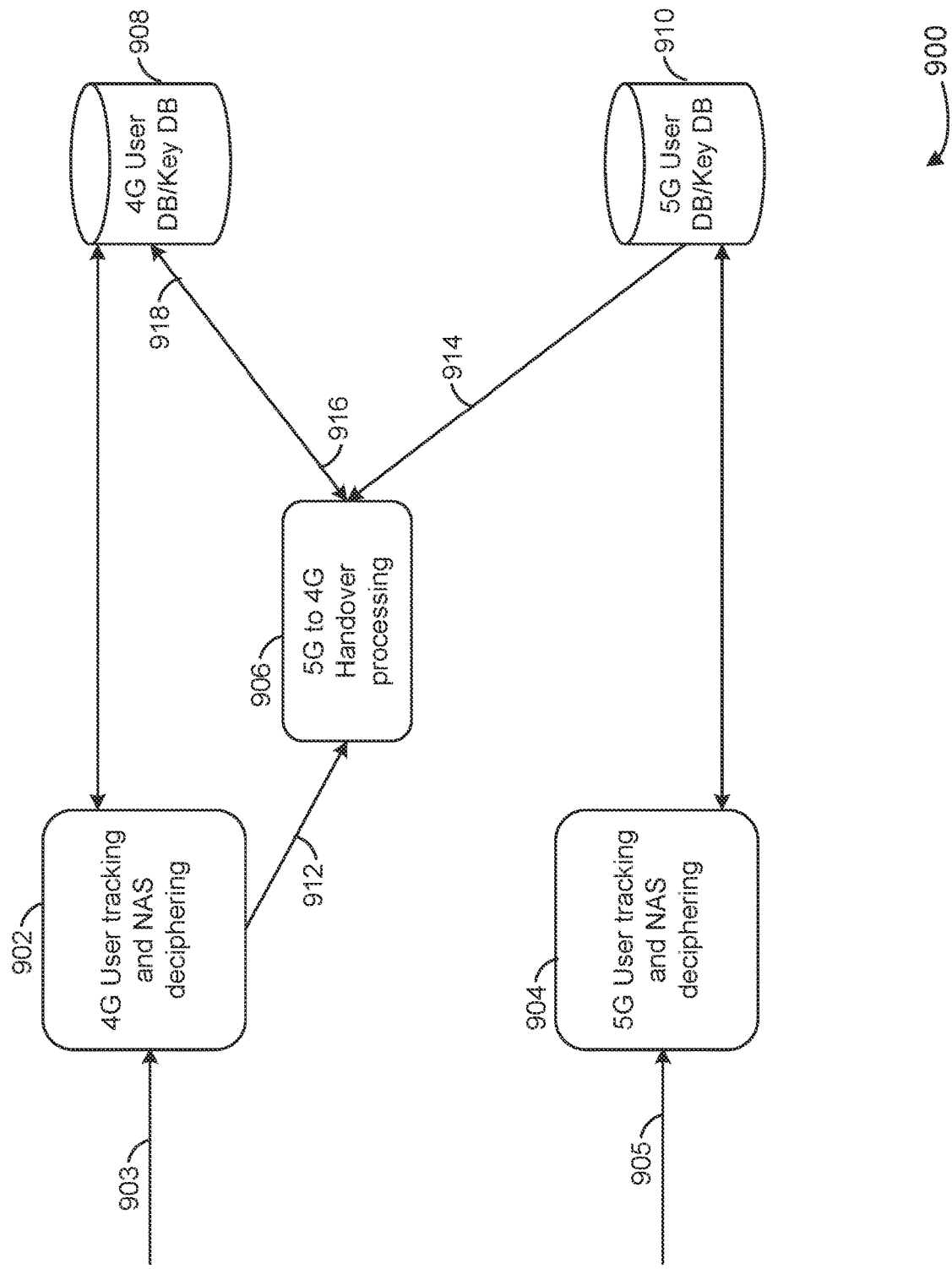
FIG. 9 is an illustration of a flow diagram of a system for USN monitoring via a virtual tap, in accordance with an implementation.

FIG. 9 is an illustration of a flow diagram of a system 900 for USN monitoring via a virtual tap, in accordance with an implementation. The system 900 can be similar to a data processing system (the data processing system 710, shown and described with reference to FIG. 7). The system 900 may include more or fewer components. The system 900 may support a 5G to 4G idle handover procedure.

The data processing system can include a 4G interface 902, a 5G interface 904, a handover processor 906, a 4G database 908, and a 5G database 910. The 4G database 908 and the 5G database 910 may include respective user and key databases. The 4G interface 902 may receive data 903 associated with a 4G communication process. For example, the data 903 may include a GTP mobility including external N26, s6a data, S1AP/NAS data, etc. The 5G interface 904 may receive data 905 associated with a 5G communication process. For example, the data 905 may include a GTP mobility including external N26, HTTP2 N12/N14, NGAP/NAS, etc. The data 903/905 may be data converted from a virtual format to a network format, as described herein with reference to FIG. 6. The interfaces 902 and 904 may receive the data from a virtual tap or a virtual tap interface.

The interfaces 902 and 904 may communicate with the databases 908 and 910. The interface 902 may use the data 903 to communicate with the database 908. For example, the interface 902 may store the data 903 into the database 908. The interface 902 may use the data 903 to retrieve stored data from the database 908. The stored data may include IMSI, 4G GUTI, IMEI, 4G security context, etc. The interface 904 may use the data 905 to communicate with the database 910. For example, the interface 904 may store the data 905 into the database 910. The interface 904 may use the data 905 to retrieve stored data from the database 910. The stored data may include IMSI, 5G GUTI, IMEI, 5G security context, etc.

The interface 902 may extract data 912 from the data 903. The extracted data 912 may include an S1 attach request, an S1 tracking area update request, a UE status, a 4G GUTI (e.g., a mobile identity), an additional GUTI, or any combination thereof. The interface 902 may send the extracted data 912 to the handover processor 906. The handover processor 906 may determine whether the extracted data 912 includes the additional GUTI. If the extracted data 912 includes the additional GUTI, the handover processor 906 may query the database 908 using the additional GUTI to retrieve data 916 (e.g., an ID, an IMSI). If the extracted data 912 does not include the additional GUTI, the handover processor 906 may convert the 4G GUTI to a 5G GUTI and query the database 910 using the converted GUTI to retrieve data 914 (e.g., an ID, an IMSI, 5G security context). Responsive to determining the IMSI and the security context, the handover processor 906 may convert one or more parameters of the security context. For example, the handover processor may convert a first key (e.g., KAMF/KSEAF) to a second key (e.g., KASME). The handover processor 906 may send (e.g., insert, store, input, update) data 918 to the database 908, the data 918 including the IMSI and the converted security context.

Figure 10:
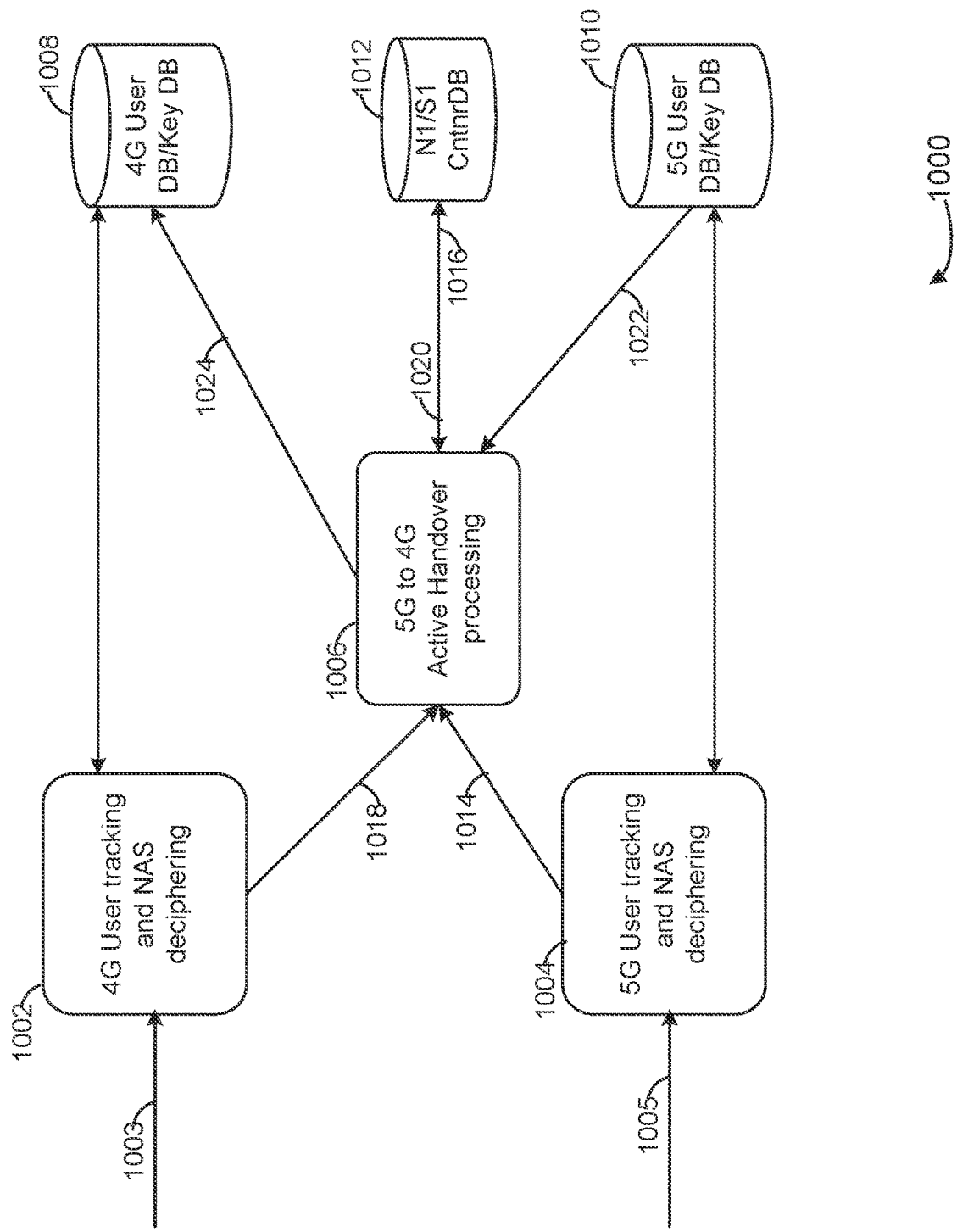
FIG. 10 is an illustration of a flow diagram of a system for USN monitoring via a virtual tap, in accordance with an implementation.

FIG. 10 is an illustration of a flow diagram of a system 1000 for USN monitoring via a virtual tap, in accordance with an implementation. The system 1000 can be similar to a data processing system (the data processing system 710, shown and described with reference to FIG. 7). The system 1000 may include more or fewer components. The system 1000 may support a 5G to 4G active handover procedure.

The data processing system can include a 4G interface 1002, a 5G interface 1004, a handover processor 1006, a 4G database 1008, a 5G database 1010, and a container database 1012. The 4G database 1008 and the 5G database 1010 may include respective user and key databases. The container database 1012 may include N1 and S1 databases. The 4G interface 1002 may receive data 1003 associated with a 4G communication process. For example, the data 1003 may include a GTP mobility including external N26, s6a data, S1AP/NAS data, etc. The 5G interface 1004 may receive data 1005 associated with a 5G communication process. For example, the data 1005 may include a GTP mobility including external N26, HTTP2 N12/N14, NGAP/NAS, etc. The data 1003/1005 may be data converted from a virtual format to a network format, as described herein with reference to FIG. 6. The interfaces 1002 and 1004 may receive the data from a virtual tap or a virtual tap interface.

The interfaces 1002 and 1004 may communicate with the databases 1008 and 1010. The interface 1002 may use the data 1003 to communicate with the database 1008. For example, the interface 1002 may store the data 1003 into the database 1008. The interface 1002 may use the data 1003 to retrieve stored data from the database 1008. The stored data may include IMSI, 4G GUTI, IMEI, 4G security context, next hop (e.g., determined from InitCtxtSetupRq, UECntxtModRq, PathswitchRqAck, HndOvrRq), etc. The interface 1004 may use the data 1005 to communicate with the database 1010. For example, the interface 1004 may store the data 1005 into the database 1010. The interface 1004 may use the data 1005 to retrieve stored data from the database 1010. The stored data may include IMSI, 5G GUTI, IMEI, 5G security context, etc.

The interface 1004 may extract data 1014 from the data 1005. The extracted data 1014 may include an N2 handover required message, an S2TTC, a handover type, an IMSI, or any combination thereof. The interface 1004 may send the extracted data 1014 to the handover processor 1006. The handover processor 1006 may determine the handover type is 5GS to EPS (e.g., 5G to 4G). The handover processor 1006 may put (e.g., store) data 1016 including the S2TTC and the IMSI into the database 1012 (e.g., one or more fields of the database 1012). The interface 1002 may extract data 1018 from the data 1003. The extracted data 1018 may include an S1 handover request message, an S2TTC, among other data. The interface 1002 may send the extracted data 1018 to the handover processor 1006. The handover processor 1006 may get (e.g., retrieve) data 1020 including the IMSI from the database 1012 by using the S2TTC from the extracted data 1018. The handover processor 1006 may get data 1022 from the database 1010 using the IMSI. The data 1022 may include security context in which the security context may include one or more of KSEAF, KAMF, algos, KSI, and NAS counts. Responsive to determining the security context, the handover processor 1006 may convert one or more parameters of the security context. For example, the handover processor 1006 may convert a first key (e.g., KAMF/KSEAF) to a second key (e.g., KASME). The handover processor may send (e.g., insert, store, input, update) data 1024 to the database 1008, the data 1024 including the IMSI and the converted security context.

Figure 11:
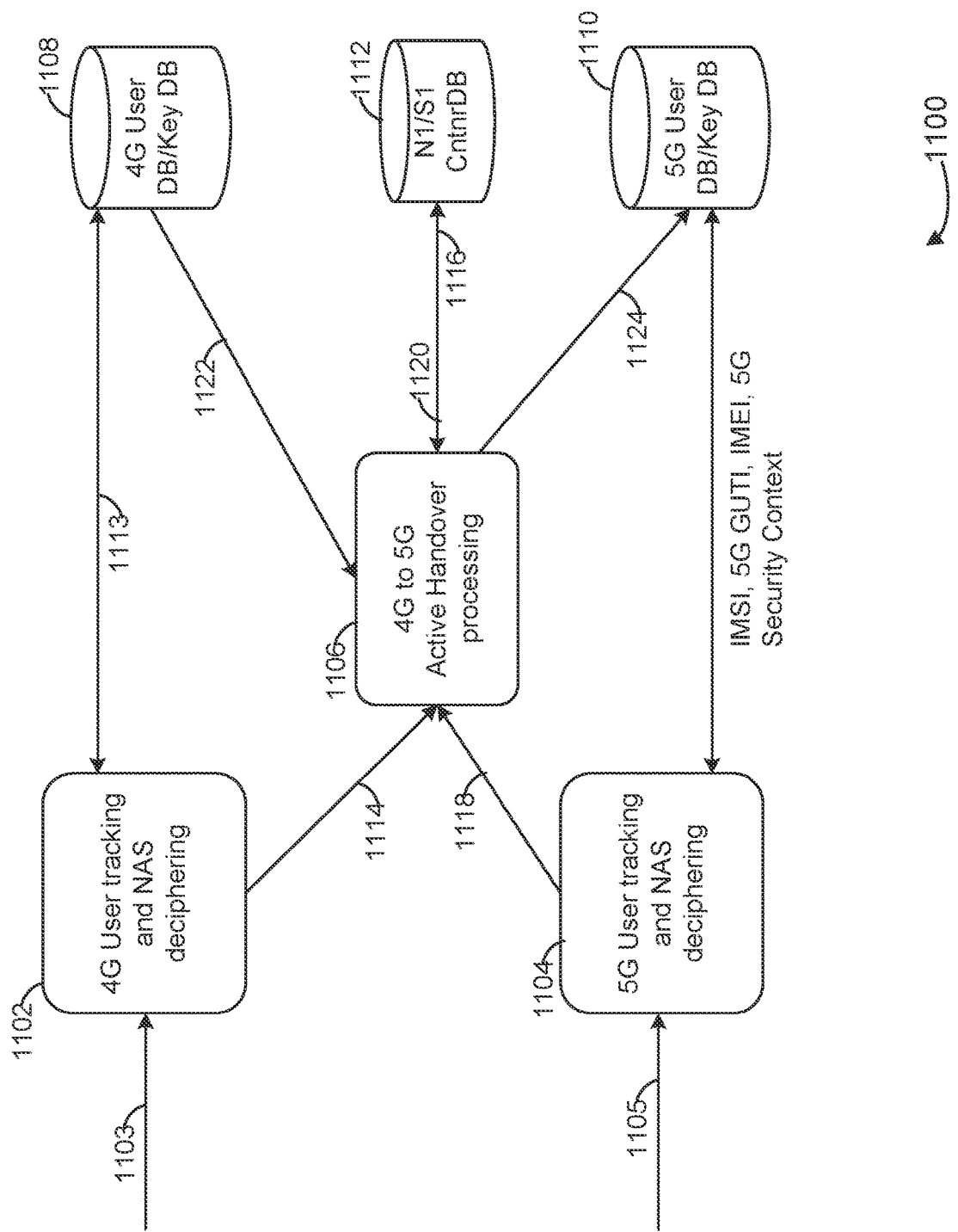
FIG. 11 is an illustration of a flow diagram of a system for USN monitoring via a virtual tap, in accordance with an implementation.

FIG. 11 is an illustration of a flow diagram of a system 1100 for USN monitoring via a virtual tap, in accordance with an implementation. The system 1100 can be similar to a data processing system (the data processing system 711, shown and described with reference to FIG. 7). The system 1100 may include more or fewer components. The system 1100 may support a 4G to 5G active handover procedure.

The data processing system can include a 4G interface 1102, a 5G interface 1104, a handover processor 1106, a 4G database 1108, a 5G database 1110, and a container database 1112. The 4G database 1108 and the 5G database 1110 may include respective user and key databases. The container database 1112 may include N1 and S1 databases. The 4G interface 1102 may receive data 1103 associated with a 4G communication process. For example, the data 1103 may include a GTP mobility including external N26, s6a data, SIAP/NAS data, etc. The 5G interface 1104 may receive data 1105 associated with a 5G communication process. For example, the data 1105 may include a GTP mobility including external N26, HTTP2 N12/N14, NGAP/NAS, etc. The data 1103/1105 may be data converted from a virtual format to a network format, as described herein with reference to FIG. 6. The interfaces 1102 and 1104 may receive the data from a virtual tap or a virtual tap interface.

The interfaces 1102 and 1104 may communicate with the databases 1108 and 1110. The interface 1102 may use the data 1103 to communicate with the database 1108. For example, the interface 1102 may store the data 1103 into the database 1108. The interface 1102 may use the data 1103 to retrieve stored data from the database 1108. The stored data may include IMSI, 4G GUTI, IMEI, 4G security context, etc. The interface 1104 may use the data 1105 to communicate with the database 1110. For example, the interface 1104 may store the data 1105 into the database 1110. The interface 1104 may use the data 1105 to retrieve stored data from the database 1110. The stored data may include IMSI, 5G GUTI, IMEI, 5G security context, etc.

The interface 1102 may extract data 1114 from the data 1103. The extracted data 1114 may include an S1 handover required message, an S2TTC, a handover type, a next hop value (e.g., determined from InitCtxtSetupRq, UECntxtModRq, PathswitchRqAck, HndOvrRq), an IMSI, or any combination thereof. The interface 1102 may store data 1113 including the next hop value in the database 1108. The interface 1104 may send the extracted data 1114 to the handover processor 1106. The handover processor 1106 may determine the handover type is LTE to 5GS (e.g., 4G to 5G). The handover processor 1106 may put (e.g., store) data 1116 including the S2TTC and the IMSI into the database 1112 (e.g., one or more fields of the database 1112). The interface 1104 may extract data 1118 from the data 1105. The extracted data 1118 may include an N2 handover request message, an S2TTC, among other data. The interface 1104 may send the extracted data 1118 to the handover processor 1106. The handover processor 1106 may get (e.g., retrieve) data 1120 including the IMSI from the database 1112 by using the S2TTC from the extracted data 1118. The handover processor 1106 may get data 1122 from the database 1108 using the IMSI. The data 1122 may include security context in which the security context may include one or more of KSEAF, KAMF, algos, KSI, and NAS counts. Responsive to determining the security context, the handover processor 1106 may convert one or more parameters of the security context. For example, the handover processor 1106 may convert a first key (e.g., KASME) to a second key (e.g., KAMF). The handover processor may send (e.g., insert, store, input, update) data 1124 to the database 1108, the data 1124 including the IMSI and the converted security context.

Figure 12:
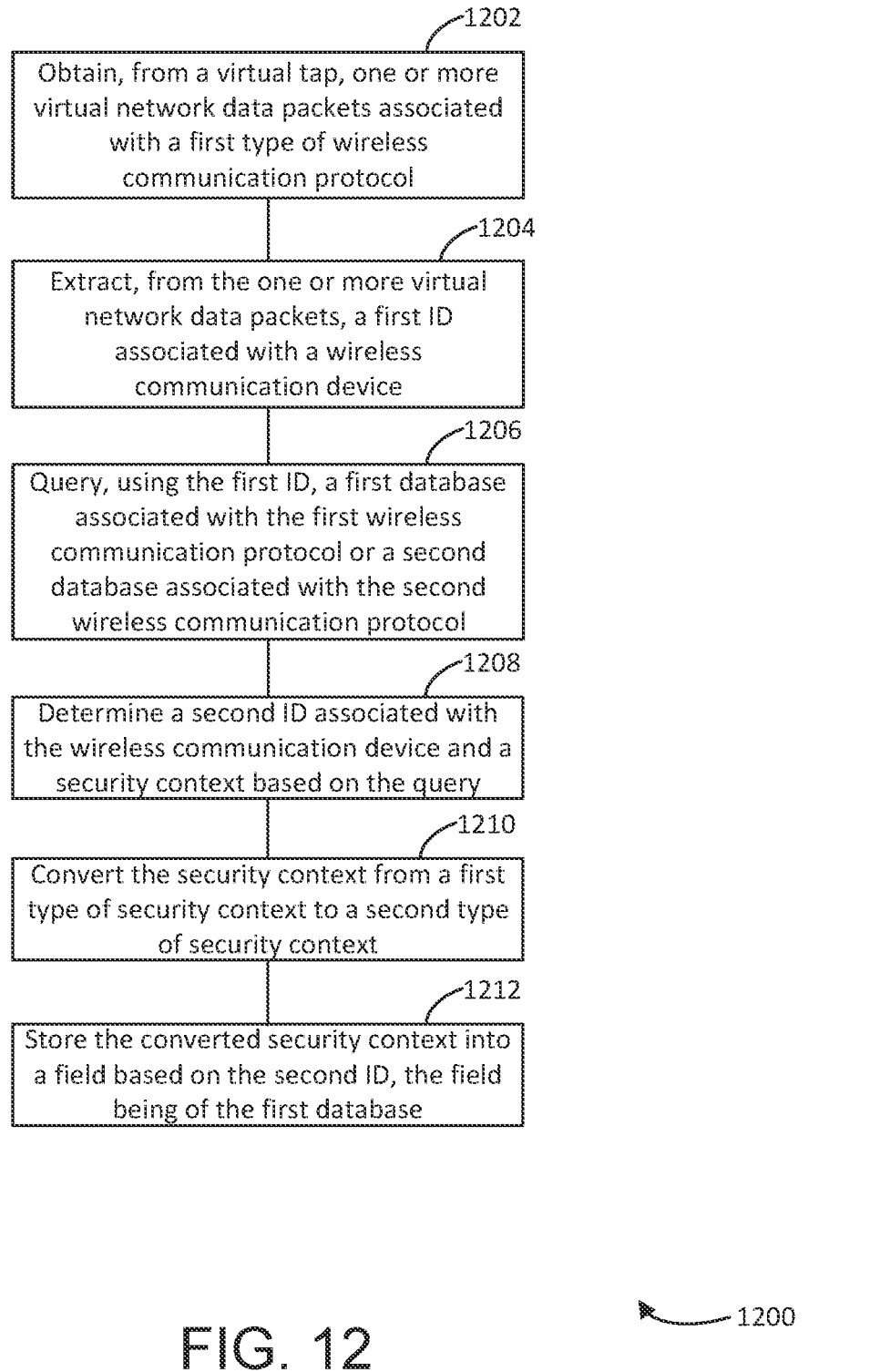
FIG. 12 is a method for USN monitoring via a virtual tap, in accordance with an implementation.

FIG. 12 is a method 7200 for remote synthetic transactions, in accordance with an implementation. The method 7200 can be performed by one or more system, component or module depicted in FIGS. 1-14C, including, for example, a data processing system or service of a cloud service provider system. The method 7200 may include more or fewer operations and the operations may be performed in any order. At ACT 7202, the data processing system can obtain, from a virtual tap, one or more virtual network data packets associated with a first type of wireless communication protocol. The data processing system can obtain the one or more virtual network data packets from a virtual USN of the virtual tap, the virtual USN comprising a virtual AMF and a virtual MME.

At operation 7204, the data processing system can extract, from the one or more virtual network data packets, a first ID associated with a wireless communication device performing an idle handover procedure from a second type of wireless communication protocol to the first type of wireless communication protocol. In some embodiments, the first ID is a GUTI. In some embodiments, the one or more virtual network data packets include a third ID, the third ID is a GUTI based on a first format associated with the first type of wireless communication protocol and the first ID is an additional GUTI. In some embodiments, the first type of wireless communication protocol is a 4G wireless communication protocol, and the second type of wireless communication protocol is a 5G wireless communication protocol. In some embodiments, the first type of wireless communication protocol is a 5G wireless communication protocol, and the second type of wireless communication protocol is a 4G wireless communication protocol.

At operation 7206, the data processing system can query, using the first ID, a first database associated with the first wireless communication protocol, or a second database associated with the second wireless communication protocol, the first database and the second database including a plurality of second IDs and a plurality of security contexts, each of the plurality of second IDs associated with a respective wireless communication device. In some embodiments, the first ID is based on a first format associated with the first type of wireless communication protocol. The data processing system can convert the first ID from the first format to a second format associated with the second type of wireless communication protocol. The data processing system can query, using the converted first ID, the second database associated with the second wireless communication protocol.

At operation 7208, the data processing system can determine a second ID associated with the wireless communication device and a security context based on the query. In some embodiments, the second ID is an IMSI. At operation 1210, the data processing system can convert the security context from a first type of security context to a second type of security context. In some embodiments, the data processing system can convert a KASME associated with the first type of wireless communication protocol to a KAMF associated with the second type of wireless communication protocol based on a parameter of the security context. In some embodiments, the data processing system can convert a KSEAF to the KAMF and the KAMF to the KASME based on the parameter of the security context. At operation 1212, the data processing system can store the converted security context into a field based on the second ID, the field being of the first database.

Figure 13:
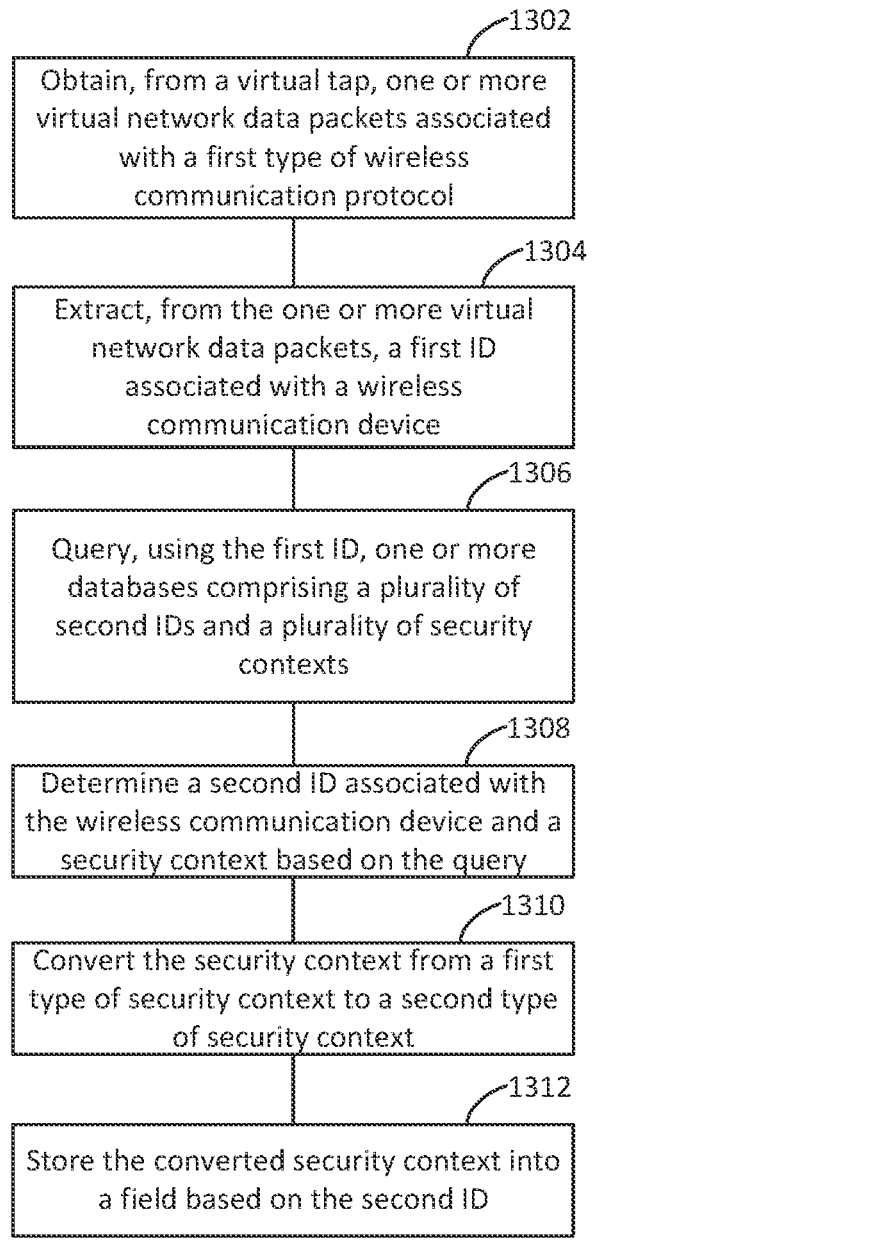
FIG. 13 is a method for USN monitoring via a virtual tap, in accordance with an implementation.

FIG. 13 is a method 7300 for remote synthetic transactions, in accordance with an implementation. The method 7300 can be performed by one or more system, component or module depicted in FIGS. 1-14C, including, for example, a data processing system or service of a cloud service provider system. The method 7300 may include more or fewer operations and the operations may be performed in any order. At ACT 7302, the data processing system can obtain, from a virtual tap, one or more virtual network data packets associated with a first type of wireless communication protocol. The data processing system can obtain the one or more virtual network data packets from a virtual USN of the virtual tap, the virtual USN comprising a virtual AMF and a virtual MME.

In some embodiments, the data processing system can obtain, from the virtual tap, one or more second virtual network data packets associated with the first type or wireless communication protocol or a second type of wireless communication protocol. The data processing system can extract, from the one or more second virtual network data packets, an indication of a handover type and a first ID. The data processing system can store a second ID into a field of one or more databases based on the first ID, wherein obtaining the one or more virtual network data packets is responsive to storing the second ID into the field of the one or more databases.

In some embodiments, the data processing system can obtain, from the virtual tap, one or more second virtual network data packets associated with the first type of wireless communication protocol. The data processing system can extract, from the one or more second virtual network data packets, a NH value. The data processing system can store the NH value into a field of the one or more databases based on the second ID, wherein obtaining the one or more virtual network data packets is responsive to storing the NH value into the field of the one or more databases. The data processing system can query, using the second ID, the one or more databases. Responsive to determining the NH value based on the querying, the data processing system can calculate a second NH value based on the NH value.

At operation 7304, the data processing system can extract, from the one or more virtual network data packets, the first ID associated with a wireless communication device performing an active handover procedure from the second type of wireless communication protocol to the first type of wireless communication protocol. In some embodiments, the first ID is an S2TTC. In some embodiments, the first type of wireless communication protocol is a 4G wireless communication protocol, and the second type of wireless communication protocol is a 5G wireless communication protocol. In some embodiments, the first type of wireless communication protocol is a 5G wireless communication protocol, and the second type of wireless communication protocol is a 4G wireless communication protocol.

At operation 7306, the data processing system can query, using the first ID, one or more databases including a plurality of second IDs and a plurality of security contexts, each of the plurality of second IDs associated with a respective wireless communication device. The data processing system can query, using the first ID, a first database associated with the first wireless communication protocol and the second wireless communication protocol, the first database comprising the plurality of second IDs. The data processing system can query, using the second ID, a second database associated with the first wireless communication protocol, the second database comprising the plurality of security contexts. In some embodiments, the second ID is an IMSI.

At operation 7308, the data processing system can determine a second ID associated with the wireless communication device and a security context based on the query. At operation 1310, the data processing system can convert the security context from a first type of security context to a second type of security context. In some embodiments, the data processing system can convert a KASME associated with the first type of wireless communication protocol to a KAMF associated with the second type of wireless communication protocol based on a parameter of the security context. In some embodiments, the data processing system can convert a KSEAF to the KAMF and the KAMF to the KASME based on the parameter of the security context.

At operation 1312, the data processing system can store the converted security context into a field based on the second ID. The data processing system can store the converted security context into the field of a third database associated with the second wireless communication protocol. In some embodiments, converting the security context is based on the second NH value.

Figure 14A:
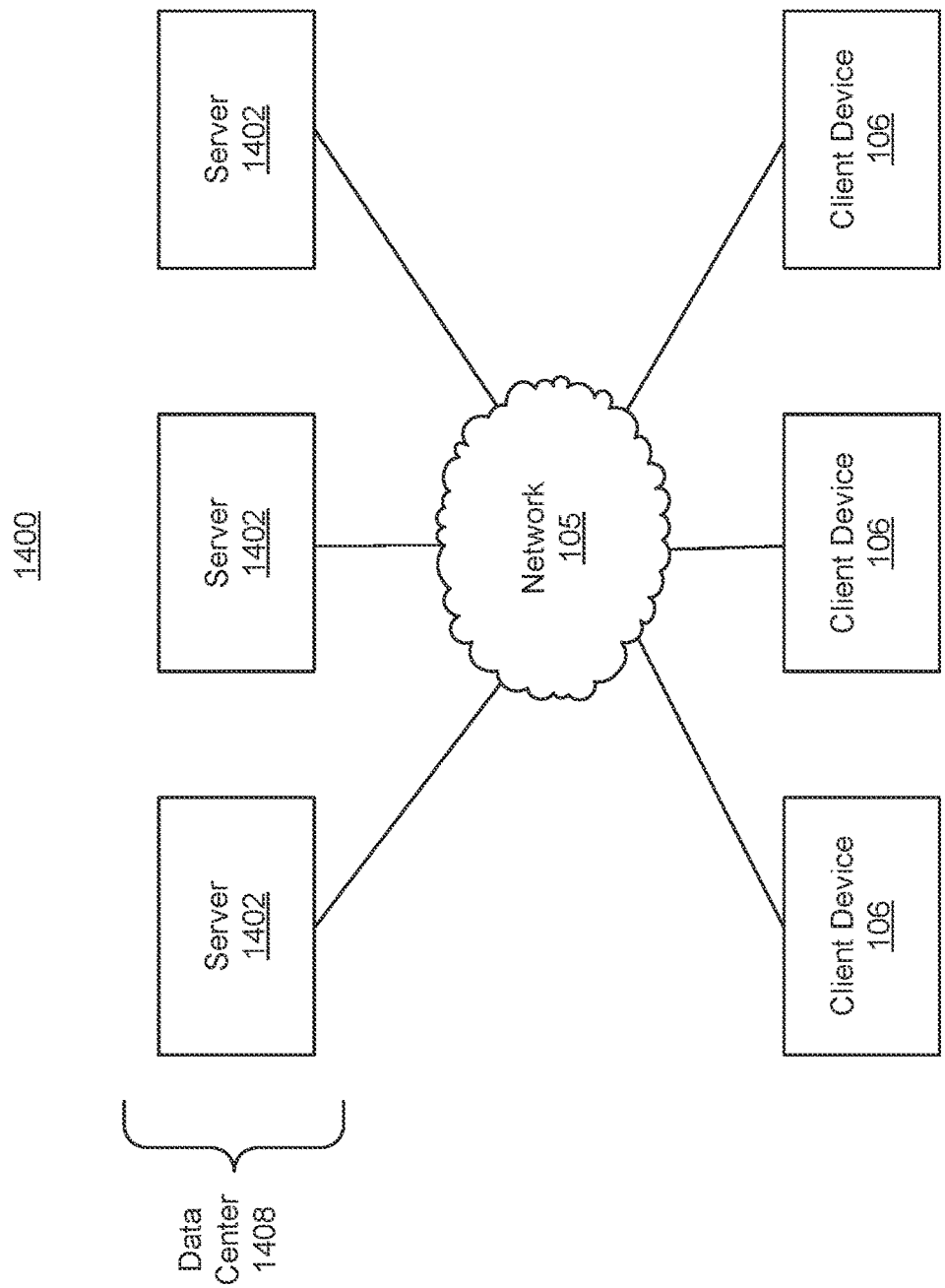
FIG. 14A is a block diagram depicting an implementation of a network environment including a client device in communication with a server device.

FIG. 14A depicts an example network environment that can be used in connection with the methods and systems described herein. In brief overview, the network environment 1400 includes one or more client devices 706 (also generally referred to as clients, client node, client machines, client computers, client computing devices, endpoints, or endpoint nodes) in communication with one or more servers 1402 (also generally referred to as servers, nodes, or remote machine) via one or more networks 705. In some embodiments, a client 706 has the capacity to function as both a client node seeking access to resources provided by a server and as a server providing access to hosted resources for other client devices 706.

Although FIG. 14A shows a network 705 between the client devices 706 and the servers 1402, the client devices 706 and the servers 1402 can be on the same network 705. In embodiments, there are multiple networks 705 between the client devices 706 and the servers 1402. The network 705 can include multiple networks such as a private network and a public network. The network 705 can include multiple private networks.

The network 705 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 705 can be any type and/or form of network. The geographical scope of the network 705 can vary widely and the network 705 can be a body area network (BAN), a personal area network (PAN), a local-area network (LAN), e.g. Intranet, a metropolitan area network (MAN), a wide area network (WAN), or the Internet. The topology of the network 705 can be of any form and can include, e.g., any of the following: point-to-point, bus, star, ring, mesh, or tree. The network 705 can be an overlay network which is virtual and sits on top of one or more layers of other networks 705. The network 705 can be of any such network topology as known to those ordinarily skilled in the art capable of supporting the operations described herein. The network 705 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPV6), or the link layer. The network 705 can be a type of a broadcast network, a telecommunications network, a data communication network, or a computer network.

The network environment 1400 can include multiple, logically grouped servers 1402. The logical group of servers can be referred to as a data center 1408 (or server farm or machine farm). In embodiments, the servers 1402 can be geographically dispersed. The data center 1408 can be administered as a single entity or different entities. The data center 1408 can include multiple data centers 1408 that can be geographically dispersed. The servers 1402 within each data center 1408 can be homogeneous or heterogeneous (e.g., one or more of the servers 1402 or machines 1402 can operate according to one type of operating system platform (e.g., WINDOWS NT, manufactured by Microsoft Corp. of Redmond, Washington), while one or more of the other servers 1402 can operate on according to another type of operating system platform (e.g., Unix, Linux, or Mac OS X)). The servers 1402 of each data center 1408 do not need to be physically proximate to another server 1402 in the same machine farm 1408. Thus, the group of servers 1402 logically grouped as a data center 1408 can be interconnected using a network. Management of the data center 1408 can be de-centralized. For example, one or more servers 1402 can comprise components, subsystems and modules to support one or more management services for the data center 1408.

Server 1402 can be a file server, application server, web server, proxy server, appliance, network appliance, gateway, gateway server, virtualization server, deployment server, SSL VPN server, or firewall. In embodiments, the server 1402 can be referred to as a remote machine or a node. Multiple nodes can be in the path between any two communicating servers.

Figure 14B:
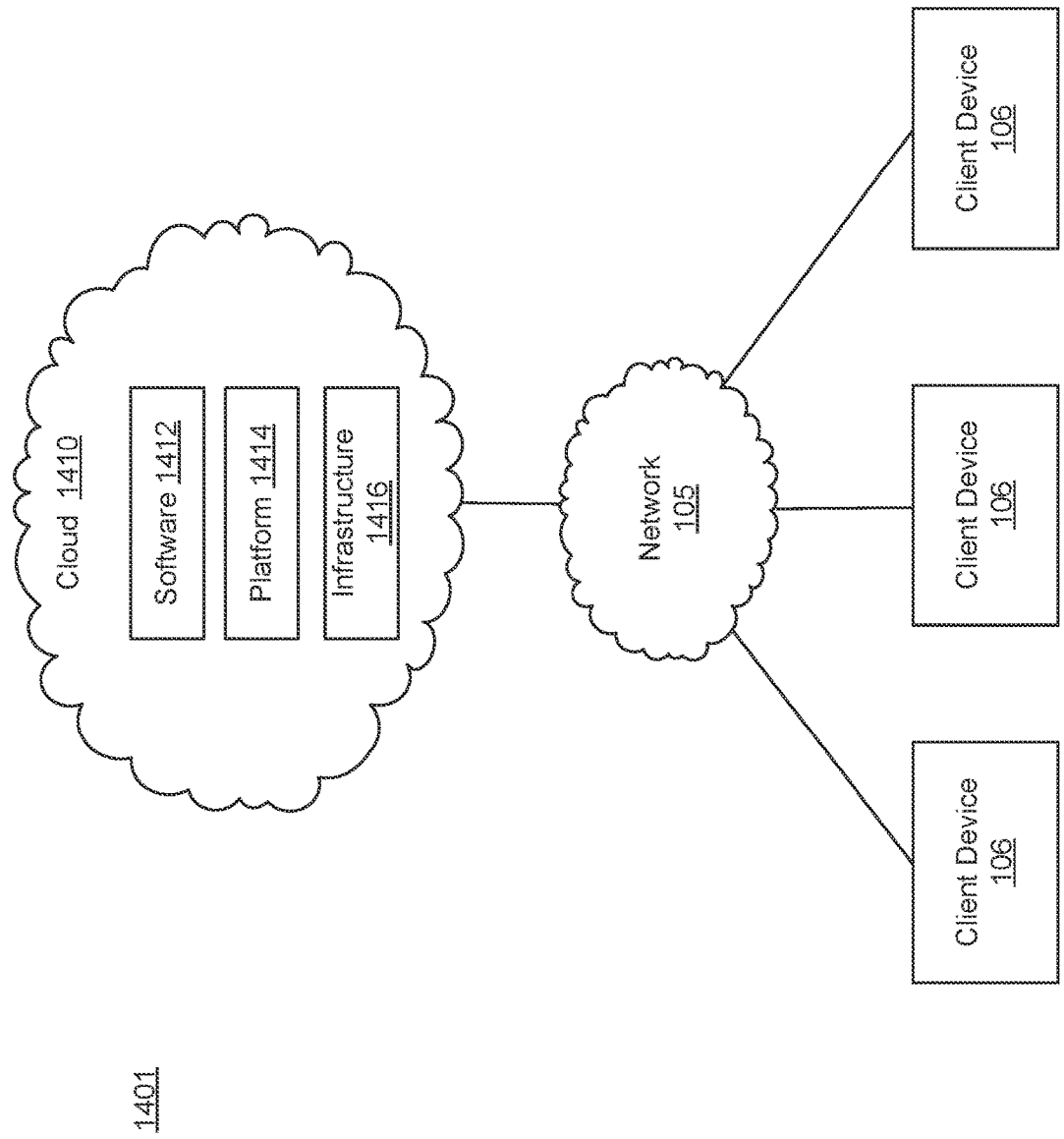
FIG. 14B is a block diagram depicting a cloud computing environment including a client device in communication with cloud service providers.

FIG. 14B illustrates an example cloud computing environment. A cloud computing environment 1401 can provide client 706 with one or more resources provided by a network environment. The cloud computing environment 1401 can include one or more client devices 706, in communication with the cloud 1410 over one or more networks 705. Client devices 706 can include, e.g., thick clients, thin clients, and zero clients. A thick client can provide at least some functionality even when disconnected from the cloud 1410 or servers 1402. A thin client or a zero client can depend on the connection to the cloud 1410 or server 1402 to provide functionality. A zero client can depend on the cloud 1410 or other networks 705 or servers 1402 to retrieve operating system data for the client device. The cloud 1410 can include back end platforms, e.g., servers 1402, storage, server farms or data centers.

The cloud 1410 can be public, private, or hybrid. Public clouds can include public servers 1402 that are maintained by third parties to the client devices 706 or the owners of the clients. The servers 1402 can be located off-site in remote geographical locations as disclosed above or otherwise. Public clouds can be connected to the servers 1402 over a public network. Private clouds can include private servers 1402 that are physically maintained by client devices 706 or owners of clients. Private clouds can be connected to the servers 1402 over a private network 705. Hybrid clouds 1408 can include both the private and public networks 705 and servers 1402.

The cloud 1410 can also include a cloud-based delivery, e.g. Software as a Service (Saas) 1412, Platform as a Service (PaaS) 1414, and the Infrastructure as a Service (IaaS) 1416. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 706 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 706 and server 1402 can be deployed as and/or executed on any type and form of computing device, e.g. a computer, network device or appliance capable of communicating on any type and form of network and performing the operations described herein.

Figure 14C:
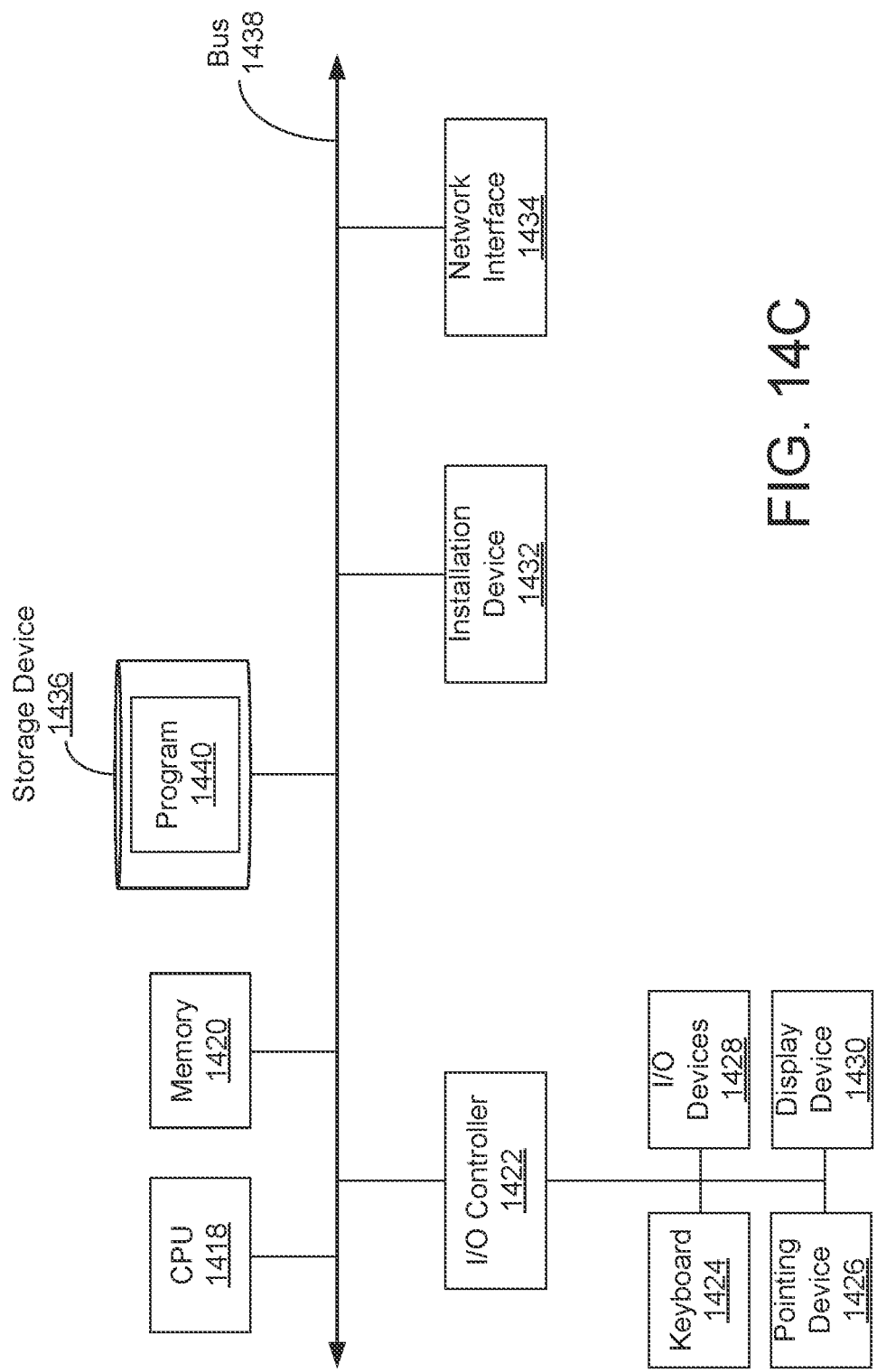
FIG. 14C is a block diagram depicting an implementation of a computing device that can be used in connection with the systems depicted in FIGS. 1, 4, and 5, and the methods depicted in FIGS. 2 and 3.

FIG. 14C depicts block diagrams of a computing device 1402 useful for practicing an embodiment of the client 706 or a server 1402. As shown in FIG. 14C, each computing device 1402 can include a central processing unit 1418, and a main memory unit 1420. As shown in FIG. 14C, a computing device 1402 can include one or more of a storage device 1436, an installation device 1432, a network interface 1434, an I/O controller 1422, a display device 1430, a keyboard 1424 or a pointing device 1426, e.g. a mouse. The storage device 1436 can include, without limitation, a program 1440, such as an operating system, software, or software associated with system 700.

The central processing unit 1418 is any logic circuitry that responds to and processes instructions fetched from the main memory unit 1420. The central processing unit 1418 can be provided by a microprocessor unit, e.g.: those manufactured by Intel Corporation of Mountain View, California. The computing device 1402 can be based on any of these processors, or any other processor capable of operating as described herein. The central processing unit 1418 can utilize instruction level parallelism, thread level parallelism, different levels of cache, and multi-core processors. A multi-core processor can include two or more processing units on a single computing component.

Main memory unit 1420 can include one or more memory chips capable of storing data and allowing any storage location to be directly accessed by the microprocessor 1418. Main memory unit 1420 can be volatile and faster than storage 1436 memory. Main memory units 1420 can be Dynamic random access memory (DRAM) or any variants, including static random access memory (SRAM). The memory 1420 or the storage 1436 can be non-volatile; e.g., non-volatile read access memory (NVRAM). The memory 1420 can be based on any type of memory chip, or any other available memory chips. In the example depicted in FIG. 14C, the processor 1418 can communicate with memory 1420 via a system bus 1438.

A wide variety of I/O devices 1428 can be present in the computing device 1402. Input devices 1428 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 1428 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 1428, display devices 1430 or group of devices can be augmented reality devices. The I/O devices can be controlled by an I/O controller 1422 as shown in FIG. 14C. The I/O controller 1422 can control one or more I/O devices, such as, e.g., a keyboard 1424 and a pointing device 1426, e.g., a mouse or optical pen. Furthermore, an I/O device can also provide storage and/or an installation device 1432 for the computing device 1402. In embodiments, the computing device 1402 can provide USB connections (not shown) to receive handheld USB storage devices. In embodiments, an I/O device 1428 can be a bridge between the system bus 1438 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 1430 can be connected to I/O controller 1422. Display devices can include, e.g., liquid crystal displays (LCD), electronic papers (e-ink) displays, flexile displays, light emitting diode displays (LED), or other types of displays. In some embodiments, display devices 1430 or the corresponding I/O controllers 1422 can be controlled through or have hardware support for OPENGL or DIRECTX API or other graphics libraries. Any of the I/O devices 1428 and/or the I/O controller 1422 can include any type and/or form of suitable hardware, software, or combination of hardware and software to support, enable or provide for the connection and use of one or more display devices 1430 by the computing device 1402. For example, the computing device 1402 can include any type and/or form of video adapter, video card, driver, and/or library to interface, communicate, connect or otherwise use the display devices 1430. In embodiments, a video adapter can include multiple connectors to interface to multiple display devices 1430.

The computing device 1402 can include a storage device 1436 (e.g., one or more hard disk drives or redundant arrays of independent disks) for storing an operating system or other related software, and for storing application software programs 1440 such as any program related to the systems, methods, components, modules, elements, or functions depicted in FIG. 1, or 2. Examples of storage device 1436 include, e.g., hard disk drive (HDD); optical drive including CD drive, DVD drive, or BLU-RAY drive; solid-state drive (SSD); USB flash drive; or any other device suitable for storing data. Storage devices 1436 can include multiple volatile and non-volatile memories, including, e.g., solid state hybrid drives that combine hard disks with solid state cache. Storage devices 1436 can be non-volatile, mutable, or read-only. Storage devices 1436 can be internal and connect to the computing device 1402 via a bus 1438. Storage device 1436 can be external and connect to the computing device 1402 via an I/O device 1430 that provides an external bus. Storage device 1436 can connect to the computing device 1402 via the network interface 1434 over a network 705. Some client devices 706 may not require a non-volatile storage device 1436 and can be thin clients or zero client devices 706. Some storage devices 1436 can be used as an installation device 1432 and can be suitable for installing software and programs.

The computing device 1402 can include a network interface 1434 to interface to the network 705 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 1402 can communicate with other computing devices 1402 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 1434 can include a built-in network adapter, network interface card, PCMCIA network card, EXPRESSCARD network card, card bus network adapter, wireless network adapter, USB network adapter, modem or any other device suitable for interfacing the computing device 1402 to any type of network capable of communication and performing the operations described herein.

A computing device 1402 of the sort depicted in FIG. 14C can operate under the control of an operating system, which controls scheduling of tasks and access to system resources. The computing device 1402 can be running any operating system configured for any type of computing device, including, for example, a desktop operating system, a mobile device operating system, a tablet operating system, or a smartphone operating system.

The computing device 1402 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 1402 has sufficient processor power and memory capacity to perform the operations described herein. In some embodiments, the computing device 1402 can have different processors, operating systems, and input devices consistent with the device.

In embodiments, the status of one or more machines 706, 1402 in the network 705 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 1402 in response to the CPU 1418 executing an arrangement of instructions contained in main memory 1420. Such instructions can be read into main memory 1420 from another computer-readable medium, such as the storage device 1436. Execution of the arrangement of instructions contained in main memory 1420 causes the computing device 1402 to perform the illustrative processes described herein. One or more processors in a multi-processing arrangement may also be employed to execute the instructions contained in main memory 1420. Hard-wired circuitry can be used in place of or in combination with software instructions together with the systems and methods described herein. Systems and methods described herein are not limited to any specific combination of hardware circuitry and software.

Although an example computing system has been described in FIG. 14, the subject matter including the operations described in this specification can be implemented in other types of digital electronic circuitry, or in computer software, firmware, or hardware, including the structures disclosed in this specification and their structural equivalents, or in combinations of one or more of them.

At least one aspect is directed to a system for USN monitoring via a virtual tap. The system can include a data processing system including memory and one or more processors to execute code stored by the memory. The data processing system can obtain, from a virtual tap, one or more virtual network data packets associated with a first type of wireless communication protocol. The data processing system can extract, from the one or more virtual network data packets, a first identification (ID) associated with a wireless communication device performing an idle handover procedure from a second type of wireless communication protocol to the first type of wireless communication protocol. The data processing system can query, using the first ID, a first database associated with the first wireless communication protocol or a second database associated with the second wireless communication protocol, the first database and the second database comprising a plurality of second IDs and a plurality of security contexts, each of the plurality of second IDs associated with a respective wireless communication device. The data processing system can, responsive to determining a second ID associated with the wireless communication device and a security context based on the query, convert the security context from a first type of security context to a second type of security context. The data processing system can store the converted security context into a field based on the second ID, the field being of the first database.

At least one aspect is directed to a method for USN monitoring via a virtual tap. The method can be performed by one or more processors. For example, the method can be performed by one or more processors of a data processing system or a cloud computing system via a virtual machine. The method can include the one or more processors obtaining, from a virtual tap, one or more virtual network data packets associated with a first type of wireless communication protocol. The method can include the one or more processors extracting, from the one or more virtual network data packets, a first identification (ID) associated with a wireless communication device performing an idle handover procedure from a second type of wireless communication protocol to the first type of wireless communication protocol. The method can include the one or more processors querying, using the first ID, a first database associated with the first wireless communication protocol or a second database associated with the second wireless communication protocol, the first database and the second database comprising a plurality of second IDs and a plurality of security contexts, each of the plurality of second IDs associated with a respective wireless communication device. The method can include the one or more processors, responsive to determining a second ID associated with the wireless communication device and a security context based on the query, converting the security context from a first type of security context to a second type of security context. The method can include the one or more processors storing the converted security context into a field based on the second ID, the field being of the first database.

At least one aspect is directed to a system for USN monitoring via a virtual tap. The system can include a data processing system including memory and one or more processors to execute code stored by the memory. The data processing system can obtain, from a virtual tap, one or more virtual network data packets associated with a first type of wireless communication protocol. The data processing system can extract, from the one or more virtual network data packets, a first identification (ID) associated with a wireless communication device performing an active handover procedure from a second type of wireless communication protocol to the first type of wireless communication protocol. The data processing system can query, using the first ID, one or more databases comprising a plurality of second IDs and a plurality of security contexts, each of the plurality of second IDs associated with a respective wireless communication device. The data processing system can, responsive to determining a second ID associated with the wireless communication device and a security context based on the querying, convert the security context from a first type of security context to a second type of security context. The data processing system can store the converted security context into a field based on the second ID.

At least one aspect is directed to a method for USN monitoring via a virtual tap. The method can be performed by one or more processors. For example, the method can be performed by one or more processors of a data processing system or a cloud computing system via a virtual machine. The method can include the one or more processors obtaining, from a virtual tap, one or more virtual network data packets associated with a first type of wireless communication protocol. The method can include the one or more processors extracting, from the one or more virtual network data packets, a first identification (ID) associated with a wireless communication device performing an active handover procedure from a second type of wireless communication protocol to the first type of wireless communication protocol. The method can include the one or more processors querying, using the first ID, one or more databases comprising a plurality of second IDs and a plurality of security contexts, each of the plurality of second IDs associated with a respective wireless communication device. The method can include the one or more processors, responsive to determining a second ID associated with the wireless communication device and a security context based on the querying, converting the security context from a first type of security context to a second type of security context. The method can include the one or more processors storing the converted security context into a field based on the second ID.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 710) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system, comprising:
a data processing system comprising one or more processors coupled with memory, the data processing system configured to:
obtain, from a virtual tap, one or more virtual network data packets associated with a first type of wireless communication protocol;
extract, from the one or more virtual network data packets, a first identification (ID) associated with a wireless communication device performing an idle handover procedure from a second type of wireless communication protocol to the first type of wireless communication protocol;
query, using the first ID, a first database associated with the first wireless communication protocol or a second database associated with the second wireless communication protocol,
the first database and the second database comprising a plurality of second IDs and a plurality of security contexts,
each of the plurality of second IDs associated with a respective wireless communication device;
responsive to determining a second ID associated with the wireless communication device and a security context based on the query,
convert the security context from a first type of security context to a second type of security context; and
store the converted security context into a field based on the second ID, the field being of the first database,
wherein the one or more virtual network data packets include a third ID, the third ID is a global unique temporary identifier (GUTI) based on a first format associated with the first type of wireless communication protocol and
the first ID is an additional GUTI.

2. The system of claim 1, wherein the one or more virtual network data packets are associated with a virtual unified serving node (USN) of the virtual tap, the virtual USN comprising a virtual access and mobility function (AMF) and a virtual mobility management entity (MME).

3. The system of claim 1, wherein the data processing system is configured to:
monitor the wireless communication device based on the converted security context.

4. The system of claim 1, wherein the first ID is based on a first format associated with the first type of wireless communication protocol, and to query using the first ID, the data processing system is configured to:
convert the first ID from the first format to a second format associated with the second type of wireless communication protocol; and
query, using the converted first ID, the second database associated with the second wireless communication protocol.

5. The system of claim 1, wherein to convert the security context, the data processing system is configured to:

convert a key access security management entry (KASME) associated with the first type of wireless communication protocol to a key access and mobility management function (KAMF) associated with the second type of wireless communication protocol based on a parameter of the security context; or convert a key security anchor function (KSEAF) to the KAMF and the KAMF to the KASME based on the parameter of the security context.

6. The system of claim 1, wherein the first ID is a global unique temporary identifier (GUTI), and the second ID is an international mobile subscriber identity (IMSI).

7. The system of claim 1, wherein the first type of wireless communication protocol is a fourth-generation wireless communication protocol, and the second type of wireless communication protocol is a fifth-generation wireless communication protocol.

8. The system of claim 1, wherein the first type of wireless communication protocol is a fifth-generation wireless communication protocol, and the second type of wireless communication protocol is a fourth-generation wireless communication protocol.

9. A system, comprising:
a data processing system comprising one or more processors coupled with memory, the data processing system configured to:
obtain, from a virtual tap, one or more virtual network data packets associated with a first type of wireless communication protocol;
extract, from the one or more virtual network data packets, a first identification (ID) associated with a wireless communication device performing an active handover procedure from a second type of wireless communication protocol to the first type of wireless communication protocol;
query, using the first ID, one or more databases comprising a plurality of second IDs and a plurality of security contexts, each of the plurality of second IDs associated with a respective wireless communication device;
responsive to determining a second ID associated with the wireless communication device and
a security context based on the query, convert the security context from a first type of security context to a second type of security context; and
store the converted security context into a field based on the second ID,
wherein the one or more virtual network data packets include a third ID, the third ID is a global unique temporary identifier (GUTI) based on a first format associated with the first type of wireless communication protocol and
the first ID is an additional GUTI.

10. The system of claim 9, wherein the one or more virtual network data packets are associated with a virtual unified serving node (USN) of the virtual tap, the virtual USN comprising a virtual access and mobility function (AMF) and a virtual mobility management entity (MME).

11. The system of claim 9, wherein the data processing system is configured to:
monitor the wireless communication device based on the converted security context.

12. The system of claim 9, wherein to query, the data processing system is configured to:
query, using the first ID, a first database associated with the first wireless communication protocol and the second wireless communication protocol, the first database comprising the plurality of second IDs; and query, using the second ID, a second database associated with the first wireless communication protocol, the second database comprising the plurality of security contexts.

13. The system of claim 12, wherein to store, the data processing system is configured to:
store the converted security context into the field of a third database associated with the second wireless communication protocol.

14. The system of claim 9, wherein the data processing system is configured to:
obtain, from the virtual tap, one or more second virtual network data packets associated with the second type of wireless communication protocol;
extract, from the one or more second virtual network data packets, an indication of a handover type and the first ID; and
store the second ID into a field of the one or more databases based on the first ID, wherein obtaining the one or more virtual network data packets is responsive to storing the second ID into the field of the one or more databases.

15. The system of claim 9, wherein the data processing system is configured to:
obtain, from the virtual tap, one or more second virtual network data packets associated with the first type of wireless communication protocol;
extract, from the one or more second virtual network data packets, a next hop (NH) value;
store the NH value into a field of the one or more databases, wherein obtaining the one or more virtual network data packets is responsive to storing the NH value into the field of the one or more databases.

16. The system of claim 15, wherein the data processing system is configured to:
query, using the second ID, the one or more databases;
responsive to determining the NH value based on the querying, calculate a second NH value based on the NH value, wherein converting the security context is based on the second NH value.

17. The system of claim 9, wherein to convert the security context, the data processing system is configured to:
convert a key access security management entry (KASME) associated with the first type of wireless communication protocol to a key access and mobility management function (KAMF) associated with the second type of wireless communication protocol based on a parameter of the security context; or
convert a key security anchor function (KSEAF) to the KAMF and the KAMF to the KASME based on the parameter of the security context.

18. The system of claim 9, wherein the first ID is a source to target transparent container (S2TTC) and the second ID is an international mobile subscriber identity (IMSI).

19. The system of claim 9, wherein:
the first type of wireless communication protocol is a fourth-generation wireless communication protocol, and the second type of wireless communication protocol is a fifth-generation wireless communication protocol; or
the first type of wireless communication protocol is a fifth-generation wireless communication protocol, and the second type of wireless communication protocol is a fourth-generation wireless communication protocol.

* * * * *